United States Patent [19]
Simmonds et al.

[11] Patent Number: 5,583,871
[45] Date of Patent: Dec. 10, 1996

[54] METHOD FOR HIGH-SPEED CHARGING OF SECONDARY BATTERIES AND APPARATUS THEREFOR

[75] Inventors: Stewart N. Simmonds, Port Coquitlam, Canada; Isamu Miyamoto, Tokyo, Japan

[73] Assignee: Datalink Corporation, Tokyo, Japan

[21] Appl. No.: 436,419

[22] PCT Filed: Apr. 20, 1994

[86] PCT No.: PCT/JP94/00651

§ 371 Date: May 24, 1995

§ 102(e) Date: May 24, 1995

[87] PCT Pub. No.: WO95/09471

PCT Pub. Date: Apr. 6, 1995

[30] Foreign Application Priority Data

Sep. 29, 1993 [JP] Japan .................... 5-243223

[51] Int. Cl.$^6$ .................... H01M 10/44; H02J 7/16
[52] U.S. Cl. .................... 320/30; 320/21; 320/35
[58] Field of Search .................... 320/20, 21, 35, 320/48, 39

[56] References Cited

U.S. PATENT DOCUMENTS

| | | | |
|---|---|---|---|
| 4,709,202 | 11/1987 | Koenck et al. | 320/43 |
| 5,200,689 | 4/1993 | Interiano et al. | 320/20 |
| 5,204,611 | 4/1993 | Nor et al. | 320/21 |
| 5,315,228 | 5/1994 | Hess et al. | 320/31 |
| 5,349,282 | 9/1994 | McClure | 320/32 |
| 5,396,163 | 3/1995 | Nor et al. | 320/21 |

FOREIGN PATENT DOCUMENTS

| | | |
|---|---|---|
| 0444617A1 | 9/1991 | European Pat. Off. . |
| 0593770A1 | 4/1994 | European Pat. Off. . |
| WO93/19496 | 9/1993 | WIPO . |

OTHER PUBLICATIONS

Battery-Based Systems Demand Unique ICs, Electronic Design, vol. 41, No. 14, pp. 47-61, Jul. 8, 1993.

*Primary Examiner*—Peter S. Wong
*Assistant Examiner*—Gregory J. Toatley Jr.
*Attorney, Agent, or Firm*—Wallenstein & Wagner, Ltd.

[57] ABSTRACT

To provide a single universal charging apparatus, capable of charging at high speed and efficiency any type of secondary battery, and capable of charging secondary batteries any arbitrary charging rate.

In selecting the arbitrary amount of current from low current to high current while charging a variety of secondary batteries, the voltage and temperature of the battery are monitored, so that either at the point at which the rate of rise of the temperature of the battery exhibits an increase over the immediately previous rate of rise that exceeds a given reference value, or at the point at which the difference in change of battery voltage is decreased continuously for a preestablished amount of time, the charging of the battery is stopped.

19 Claims, 18 Drawing Sheets

$\Delta Hv_1 = \Delta TDv_1 - \Delta TDv_0 > 0$    COUNT VALUE N: 0
$\Delta Hv_2 = \Delta TDv_2 - \Delta TDv_1 < 0$    1
$\Delta Hv_3 = \Delta TDv_3 - \Delta TDv_2 < 0$    2
$\Delta Hv_4 = \Delta TDv_4 - \Delta TDv_3 < 0$    3 (OUTPUT OF SIGNAL THAT STOPS CHARGING)

① $\Delta TDt_2 / \Delta TDt_1 < K$
② $\Delta TDt_3 / \Delta TDt_2 < K$
③ $\Delta TDt_4 / \Delta TDt_3 < K$ (OUTPUT OF SIGNAL THAT STOPS CHARGING)

CHARGING VOLTAGE CHARACTERISTICS OF A NICKEL-CADMIUM BATTERY
ts=16 S, RATE=3C

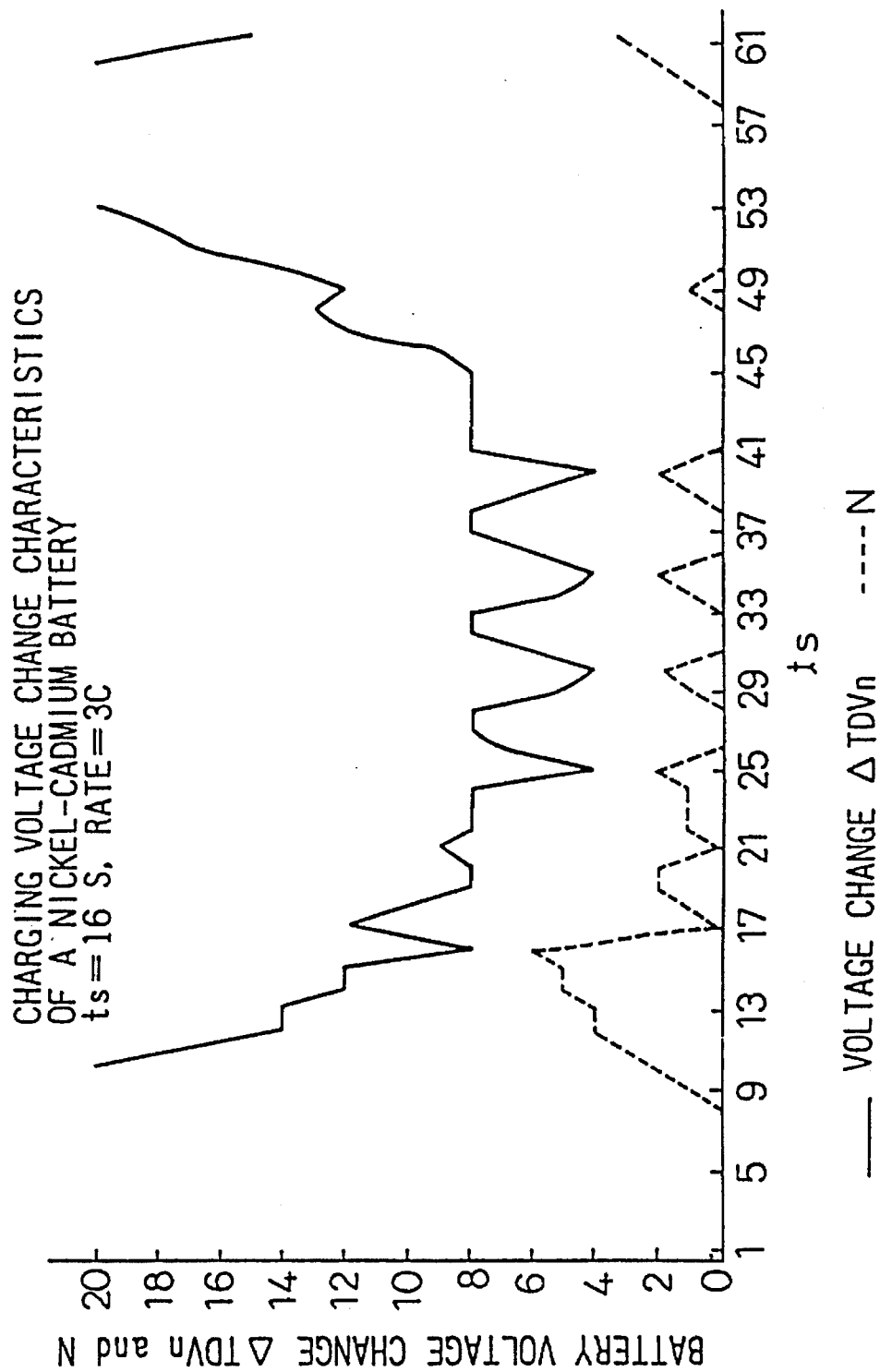

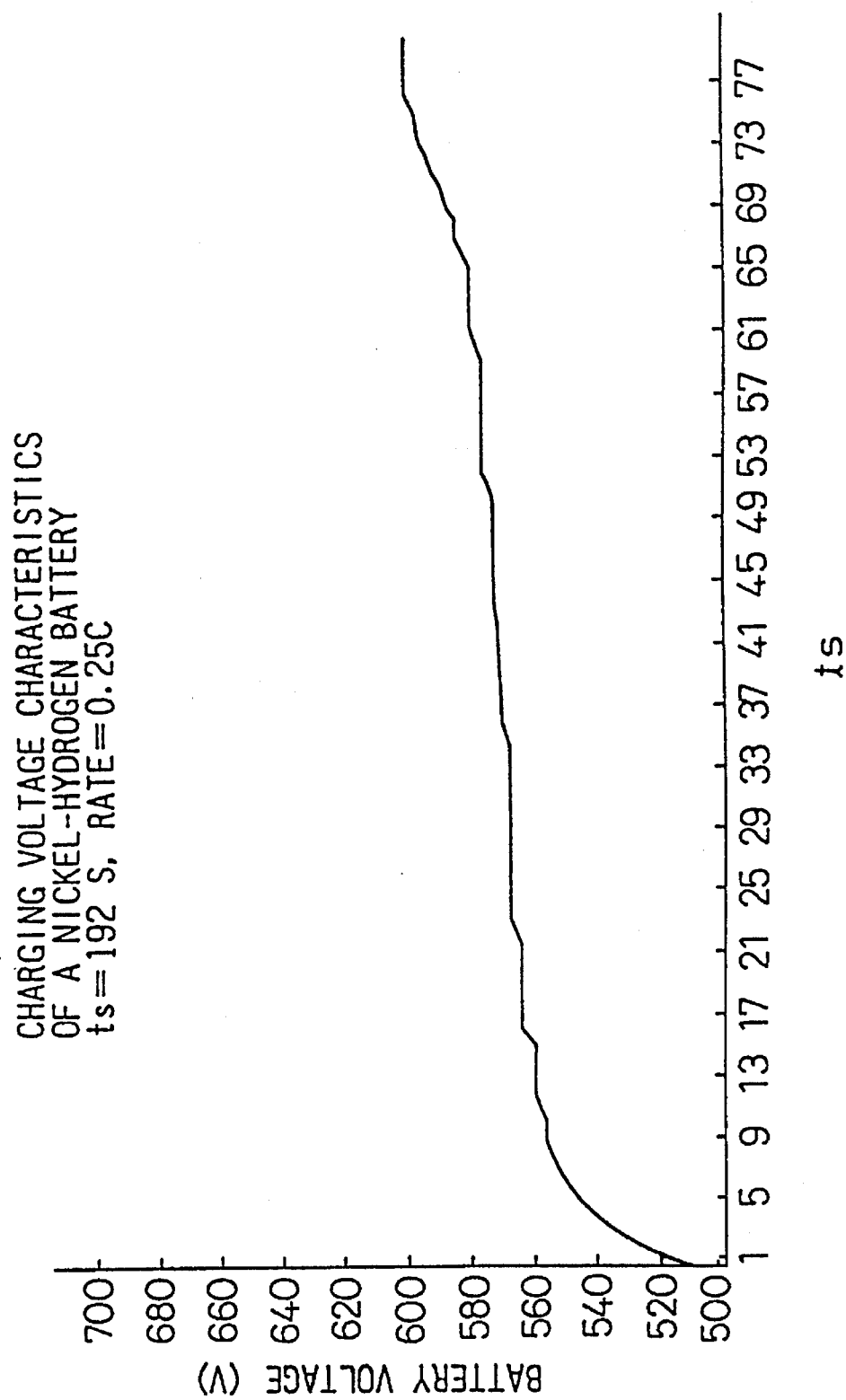

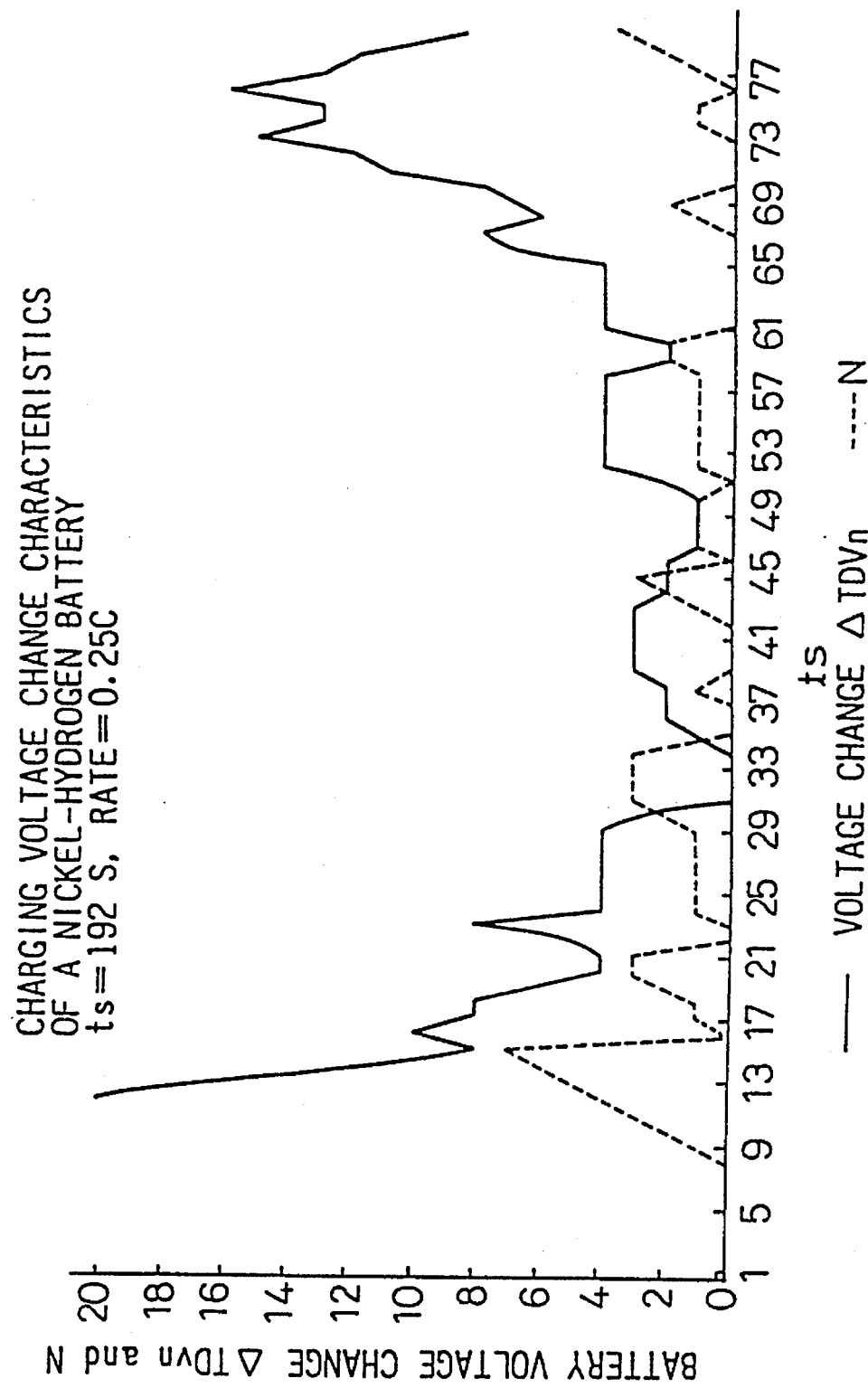

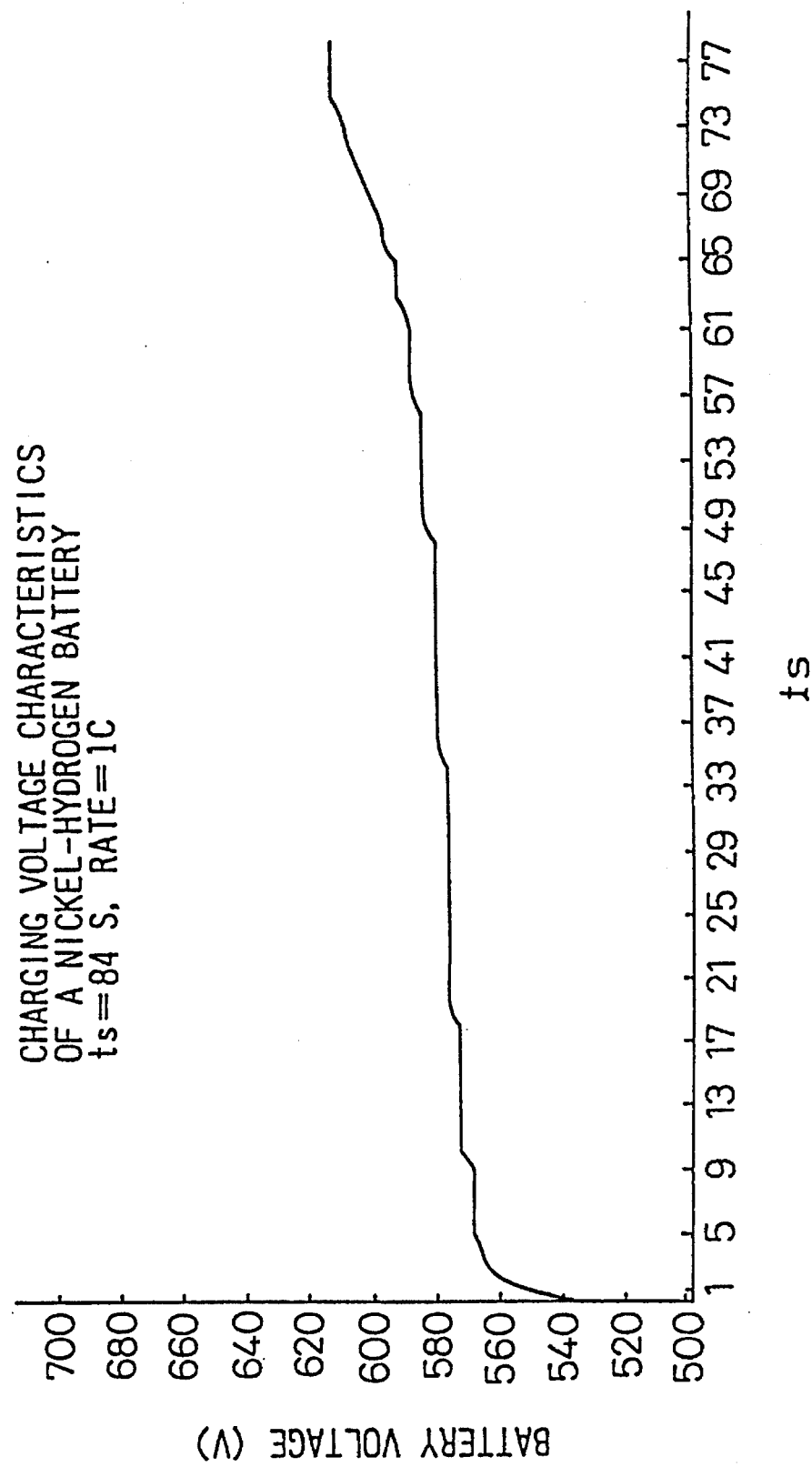

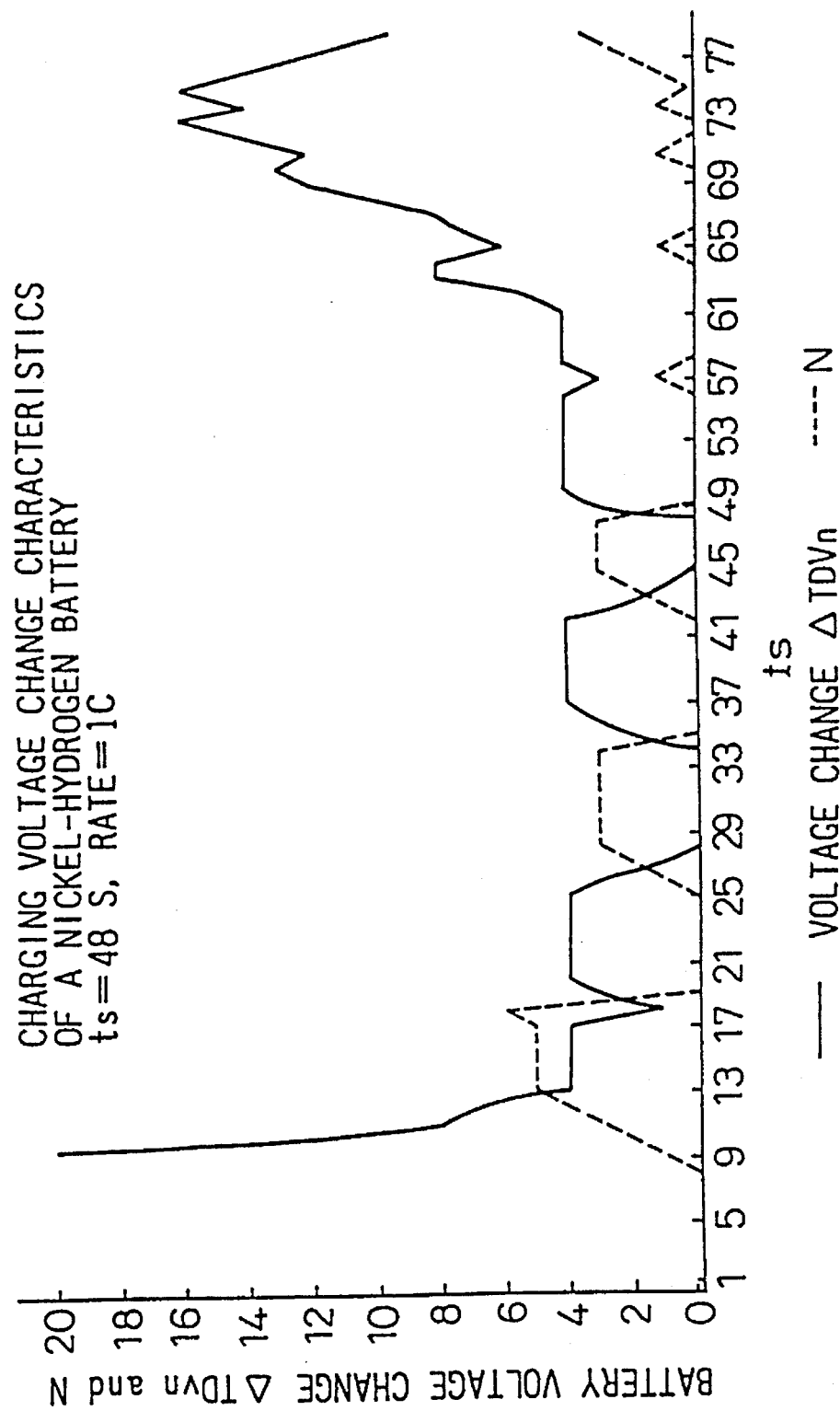

5,583,871

METHOD FOR HIGH-SPEED CHARGING OF SECONDARY BATTERIES AND APPARATUS THEREFOR

TECHNICAL FIELD

The present invention is related to the high-speed charging of secondary batteries and, more specifically, to a high-speed charging apparatus and high-speed charging method for such secondary batteries as nickel-cadmium batteries, nickel-hydrogen batteries, and lithium ion batteries.

The present invention is configured so as to enable, with regard to nickel-cadmium, nickel-hydrogen (Ni/H2) and lithium ion secondary batteries, the monitoring of the temperature and voltage of the battery during the recharging process, and so as to stop said charging process when these monitored parameters of either temperature or temperature and voltage reach a particular condition.

BACKGROUND ART

Secondary batteries (secondary cells) such as Nickel-cadmium storage batteries, nickel-hydrogen batteries, or lithium ion batteries can be recharged any number of times during their useful lifetimes. It is widely known by persons skilled in the art that this recharging process must be performed under careful control to minimize the damaging affects to the storage battery. (For example refer to "Charging Storage Batteries: Extending Useful Life", Bob Williams, "Cellular Business" April, 1989, pp 44 to 49.)

At the beginning of secondary battery recharging technology, the process of recharging required as much as a number of hours. As consumer products powered by secondary batteries became more and more common, there arose a need for a system capable of charging times measured in minutes rather than hours.

While it is possible to fast charge a secondary battery, to prevent irreversible damage to the storage battery, the storage battery recharging process must be performed with even more care. (For example refer to "Latest Information on Nickel-Cadmium Batteries" in the report of the September 1990 Cadmium Society Brussels Seminar, published in November, 1990.)

Prior art has shown that a variety of systems have been developed for the fast recharging of secondary batteries. In these systems it has been standard to monitor the voltage and/or temperature of the storage battery being charged, and to interrupt or change the charging current applied to the storage battery when the temperature or voltage reaches a preestablished level. Typical prior art is described in U.S. Pat. No. 4,006,397 (Catotti et al).

Japanese patent publications Sho 62-23528 and Sho 62-23529 disclose a method for use in recharging of secondary batteries such as nickel-cadmium batteries, wherein the voltage waveform of the battery is observed during charging, a number of deflection points appearing in the voltage waveform being stored beforehand, and if the stored deflection points occurred in a given sequence, the charging process is interrupted. In this method, however, it is required for each type of battery to store beforehand the variations occurring in the voltage waveform of that type of battery during the charging process, and to change the stored contents before charging to contents appropriate to the type of battery to be recharged, not only making operation complex, but giving no assurance, by reasons of the charging environment and history of the battery, that the voltage output waveform of the battery would follow in sequence an a amplitude the stored information, thereby making it impossible to perform accurate charging and recharging, making it difficult to perform high-speed charging without causing loss of battery performance.

In addition to nickel-cadmium, nickel-hydrogen and lithium ion batteries exist as secondary batteries.

Previously the recharging of the above-mentioned secondary batteries, it required from 6 hours to even as much as 16 hours in some instances, and even with what was called fast charging at over a relatively short time, still required 1 to 2 hours.

In the past, although in recharging what were called rechargeable batteries or storage batteries for use in their intended purposes, it was known that it was desirable to make the charging time as short as possible, the limitations imposed by the rise in internal battery temperature and internal pressure in the battery caused by a chemical reaction within the secondary battery not only lead to destruction of the cells, but also to a deterioration of the electrical characteristics of the cells, that is, the output characteristics and charging characteristics, so that the method of charging by means of a large current over a short period of time was not used.

However, today the demand for secondary batteries is increasing in a large of number of applications in various industries, and in particular, there is a strong demand for secondary batteries for use in applications such as in environments in which machine tools are used, in medical and other equipment for hospitals, and in communications, such as in mobile telephones, applications which not only require that batteries do not run down during operation but also require fast or even instantaneous recharging.

If a graphical comparison is made of the above-mentioned voltage and temperature variations with respect to charge level during the charging of the various types of secondary batteries mentioned above, it can be seen that each type of battery exhibits unique characteristics, as shown in FIG. 2 to FIG. 4.

That is, the voltage and temperature characteristics of a nickel-cadmium storage battery are as shown in FIG. 2, the voltage and temperature characteristics of a nickel-hydrogen battery are as shown in FIG. 3, and the voltage and temperature characteristics of a lithium ion battery are as shown in FIG. 4.

For this reason, in the past, not only did the charging Of any type of secondary battery require a long period of time of at least one hour, but also it had the problem of requiring a change of the charging method or charging apparatus to suit the type of secondary battery, making the only charging methods available troublesome, time-consuming, and costly.

The purpose of the present invention is to improve the above-described shortcomings of the prior art, and to facilitate the recharging of secondary batteries, and in particular nickel-cadmium, nickel-hydrogen, and lithium ion secondary batteries, within an extremely short period of time of from several minutes to 20 minutes. Recharging at this extremely fast speed increases the significance of a number of parameters which were not so significant in the relatively slow-speed prior art recharging systems. However, it was discovered that these parameters could be processed so as to produce a recharging system which performs safe, high-speed charging without damaging side-effects to the storage battery being charged.

In the past, to charge secondary batteries which consist of mutually differing technical elements, and which have differing charging characteristics and behavior, it was necessary to make available separate chargers and to select the charger appropriate for charging the type of secondary battery to be charged.

Therefore, the charger was something to be used only for the charging of a particular type of secondary battery, it being necessary to make available individual chargers for individual secondary batteries, making the charging operation not only inconvenient, but troublesome and complex as well.

Even for the same type of secondary batteries, if an amount of charging current used in a charging operation, which is generally represented by a charge rate C, differ, the chargers would have to be provided separately, causing the problem of the heed to have a considerable number of charger types available.

However, with the demand for such secondary batteries increasing, and with a diversification in the fields and location in which secondary batteries are used, there has arisen an increasing need for a charger capable of use anywhere in charging any type of secondary battery completely within a short period of time, for applications requiring quick charging and immediate use of secondary batteries, such as in mobile data communications, mobile telephone communications, and at construction sites.

For this reason, the is a desire to have a single charger not only capable of charging a secondary battery of any type of construction, but also capable of charging under any charging rate C conditions. However, until the present, there has been no such practically usable charger.

Therefore, the object of the present invention is to improve on the defects described above, and provide a single charger which is universally usable to charge any type of secondary battery in a short period of time under any arbitrary charging rate C.

DISCLOSURE OF INVENTION

To solve the above-described problems, the present invention has the following technical configuration. Specifically, the first aspect of the method of high-speed charging of secondary batteries of the present invention is a method for charging secondary batteries comprising, a step 1 which sets the basic data reading time tb required to read data, a step 2 which sets the charging rate C, a step 3 which sets the corrected data reading time tc, according to the set charging rate C and said basic data reading time tb, said corrected data reading time tc being characteristic to said charging rate C, a step 4 which, during the charging operation, uses an appropriate sampling means to measure the terminal voltage of said secondary battery at least one time during each said corrected data reading time tc, and which stores the voltage data at that time into an appropriate 1st memory means, a step 5 which repeats the operation of said step 4 a predetermined number of times L, takes the summation of the plurality of voltage data obtained in each corrected data reading time tc, and stores the resulting amount of change Dvn over the amount of voltage data change reading sampling time ts (where ts=L×tc) into an appropriate 2nd memory means, a step 6 which calculates the difference between the amount of change Dv1 for the 1st sampling time (ts1) and the amount of change Dv2 for the next, 2nd, sampling time (ts2) obtained in step 5, and which stores the resulting difference in amount of change $\Delta Dv$ in a 3rd memory means, a step 7 which continuously repeats said step 6 a predetermined number of times M, and which takes the summation of each of the values of $\Delta Dv1$ to $\Delta DvM$ (M values) obtained at each amount of change reading sampling time (ts), and determines the amount of voltage data change $\Delta TDv$ for the overall said amount of change reading sampling time t (where t=ts×M), the results being stored in a 4th memory means, a step 8 which performs a calculation, based on the amount of voltage data change $\Delta TDv$ stored in said 4th memory means, to determine the difference $\Delta Hv$ between the voltage amount of change $\Delta TDv1$ measured from over the first overall amount of change reading sampling time t1 established as running from said 1st sampling time (ts1) to the mth sampling time (tsM) for the predetermined M-th sampling, and the voltage amount of change $\Delta TDv2$ measured from over the second overall amount of change reading sampling time established as running from said 2nd sampling time (ts2) to the (m+1)th sampling time (tsM+1) for the predetermined M+1-th sampling, said calculated difference $\Delta Hv$ (where $\Delta Hv=\Delta TDv2-\Delta TDv1$) being stored in a 5th memory means, a step 9 which repeats said step 8 while calculating the difference value $\Delta Hvn$ (where $\Delta Hvn=\Delta TDv(N+1)-\Delta TDvn$) between the amount of voltage changes $\Delta TDvn$ and $\Delta TDv(n+1)$ at each pair of adjacent overall amount of change sampling times tn and tn+1, and stores the calculated results in 5th memory means, a step 10 which judges whether each of the m amounts of differences in amount of voltage changes $\Delta Hv1$ to $\Delta Hvm$ obtained continuously in said step 9 are positive (zero or greater than zero) or negative (less than zero), and a step 11 which judges, in the sequence of occurrence of said differences in amount of voltage changes $\Delta Hv1$ to $\Delta Hvm$, whether or not said difference in amount of voltage change $\Delta Hv$ is zero or negative for a predetermined number of S times continuously, and if said difference in amount of voltage change $\Delta Hv$ is zero or negative S times continuously, stops said charging.

Additionally, the second aspect of the method of high-speed charging of secondary batteries of the present invention is a method for charging secondary batteries comprising, a step 1 which sets the basic data reading time tb required to read data, a step 2 which sets the charging rate C, a step 3 which sets the corrected data reading time tc, according to the set charging rate C and said basic data reading time tb, said corrected data reading time tc being characteristic to said charging rate C, a step 4 which, during the charging operation, uses an appropriate sampling means to measure the temperature of said secondary battery at least one time during each said corrected data reading time tc, and which stores the temperature data at that time in an appropriate 1st memory means, a step 5 which repeats the operation of said step 4 a predetermined number of times L, takes the summation of the plurality of data obtained in each corrected data reading time tc, and stores the resulting amount of change Dtn over the amount of temperature data change reading sampling time ts (where ts=L×tc) into an appropriate 2nd memory means, a step 6 which calculates the difference between the amount of change Dt1 for the 1st sampling time (ts1) and the amount of change Dt2 for the next, 2nd, sampling time (ts2) obtained in step 5, and which stores the resulting difference in amount of change $\Delta Dt$ in a 3rd memory means, a step 7 which continuously repeats said step 6 a predetermined number of times M, and which takes the summation of each of the values of $\Delta Dt1$ to $\Delta DtM$ (M values) obtained at each amount of change reading sampling time (ts), and determines the amount of temperature data change $\Delta TDt$ for the overall said amount of temperature change reading sampling time t (where t=ts×M), the results being stored in a 4th memory means, a step 8 which performs a calculation, based on the values of amount of temperature data change ΔTDt stored in said 4th memory means, to determine the ratio between the temperature amount of change ΔTDt1 measured from over a first overall amount of change reading sampling time t1 established as running from said 1st sampling time (ts1) to the sampling time (tsM) for the predetermined M-th sampling, and the temperature amount of change ΔTDt2 measured from over a second overall amount of change reading sampling time t2 established as running from said 2nd sampling time (ts2) to the sampling time (tsM+1) for the predetermined M+1-th sampling, said calculated ratio ΔHt (where ΔHt=ΔTDt2/ΔTDt1) being stored in a 5th memory means, a step 9 which repeats the operations of said step 8 while calculating the ratio value ΔHtn (where ΔHtn=ΔTDt(N+1)/ΔTDtn) between the amount of temperature changes ΔTDtn and ΔTDt(n+1) at each pair of adjacent overall amount of change sampling times tn and tn+1, and stores the calculated results in 5th memory means, a step 10 which judges from the information stored in said 5th memory means whether the ratio ΔHm between two adjacent said temperature amounts of change is equal to or greater than or is less than a given value K, and a step 11 which, if the temperature amount of change ratio ΔHm value is equal to or greater than the given value K, stops said charging.

In addition, it is possible to think of the coupling of the two above-described aspects of the present invention of a high-speed secondary battery charging method as a third aspect of the present invention.

Because the high-speed charging method for secondary batteries of the present invention makes use of the above-described basic technical configuration, even for secondary batteries of differing types, in consideration of the mutually differing charging characteristics exhibited by the secondary batteries, such as terminal voltage or temperature, it is possible to determine the common characteristics of secondary batteries having differing constituent elements, to accurate determine point at which the charge level reaches nearly 100%, enabling not only one and the same apparatus to be used to reliably charge secondary batteries of differing construction, but also enabling the accurate determination of the charge level during the charging process, the quick determination of the point at which the charge level reaches a level of nearly 100%, and the stopping of the charging process at that point, the result being not only a reliable avoidance of the problem encountered when the charging is continued even after the charge level has exceeded 100%, thereby causing the temperature of the secondary battery to rise above its rated maximum temperature, leading to damage to said secondary battery, but also a determination of the characteristics of said secondary battery with respect to the speed of charge, or charge rate, thereby enabling charging of secondary batteries which are of the same constituent elements at different charge rates, further enabling in particular the precise high-speed charging of secondary batteries.

BRIEF DESCRIPTION OF THE DRAWINGS

FIG. 16 is a graph showing the a graph of the changes in the overall voltage amount of change ΔTDvn and the counter value N when the charging of FIG. 15 is done.

FIG. 17 is a graph showing one example of the voltage characteristics of a nickel-hydrogen battery when charged at 0.25 C.

FIG. 18 is a graph showing the a graph of the changes in the overall voltage amount of change ΔTDvn and the counter value N when the charging of FIG. 17 is done.

FIG. 19 is a graph showing one example of the voltage characteristics of a nickel-hydrogen battery when charged at 1 C.

FIG. 20 is a graph showing the a graph of the changes in the overall voltage amount of change ΔTDvn and the counter value N when the charging of FIG. 19 is done.

BEST MODE FOR CARRYING OUT THE INVENTION

The following is a detailed description, presented with reference to drawings, of concrete examples of the method and apparatus high-speed charging of secondary batteries of the present invention.

The background of why the inventors of the present invention employed the above-described technical configuration in the method for high-speed charging of secondary batteries of the present invention starts with the inventors of the present invention making a thorough analysis and investigation of the charging characteristics of secondary batteries that have been commercially available in the past, and making efforts to determine, for the purposes of fulfilling the above-described object of the present invention, the desired form of a single apparatus and method for performing high-speed charging of different types of secondary batteries, for performing precise charging even if the charging rate is varied with respect to said secondary batteries of differing types, and further for performing high-speed charging of said secondary batteries of differing types.

Figure 2:
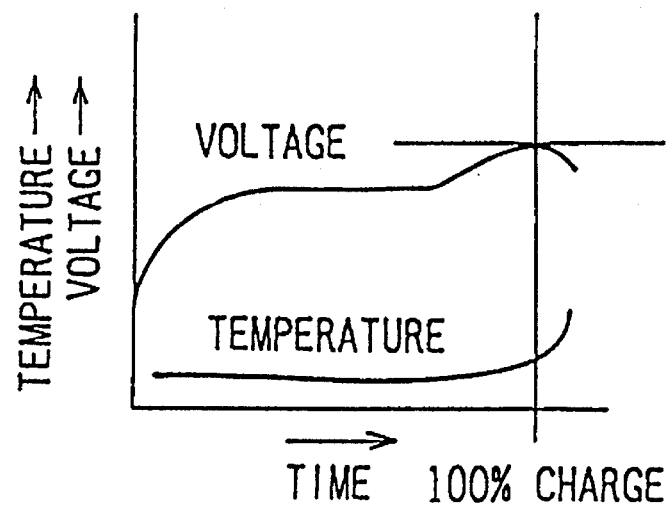
FIG. 2 is a graph which shows the charging characteristics of a nickel-cadmium battery.

The inventors, then, analyzed, the nickel-cadmium batteries, nickel-hydrogen batteries, and lithium ion batteries, which were thought to be the important types of those types commercially available in the past, the result of this analysis being that in general for nickel-cadmium batteries, as shown in FIG. 2, the terminal voltage during charging continues a gradual increase up to the point at which 100% charge level is reached, at which point a peak voltage is reached, with further charging causing a decrease in voltage.

When the temperature of a nickel-cadmium battery is observed, there is a slight increase in temperature from the start of charging to just before the 100% charge level, and although the overall characteristics is virtually flat with no extremely temperature increase, except when the 100% charge level region is approached, when there is a sudden increase in temperature.

Figure 3:
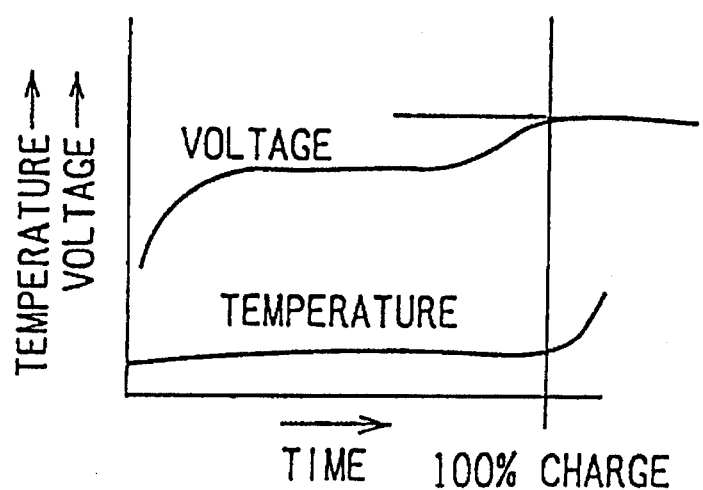
FIG. 3 is a graph which shows the charging characteristics of a nickel-hydrogen battery.

In the case of nickel-hydrogen batteries, which is shown in FIG. 3, the battery terminal voltage continues its gradual increase from the start of the charge until the 100% charge level, and when the charge level reaches 100% the voltage value exhibits the peak value, after which subsequent charging results in no further change the battery voltage, which maintains the peak value.

The temperature of a nickel-hydrogen battery, similar to a nickel-cadmium battery, gradually increase from the start of charging to just before the 100% charge level, and although the overall characteristics is virtually flat with no extremely temperature increase, except when the 100% charge level region is approached, when there is a sudden increase in temperature.

Figure 4:
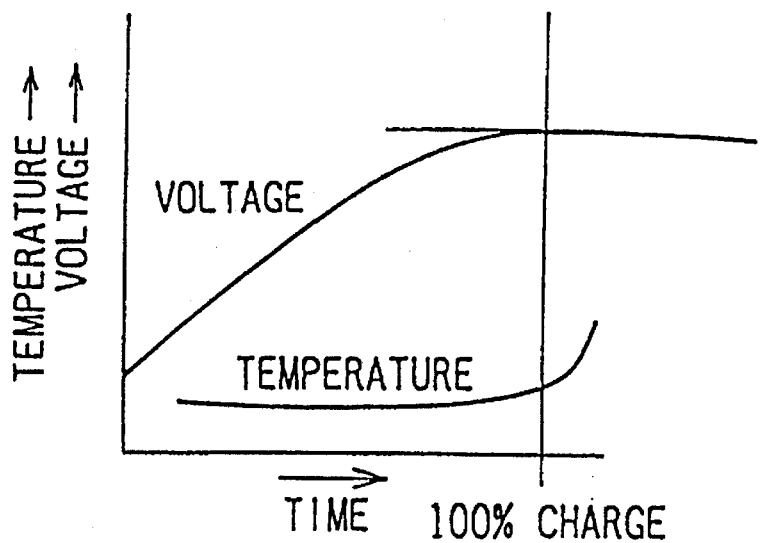
FIG. 4 is a graph which shows the charging characteristics of a lithium ion battery.

In the case of yet another type of secondary batteries, lithium ion batteries, as shown in FIG. 4, the battery terminal voltage increasing approximately in direct proportion to elapsed time, from the start of charging to the 100% charge level, and when the 100% charge level is reached, the voltage value exhibits the peak value, after which subsequent charging results in no further change in the battery voltage, which maintains the peak value.

The battery temperature in the case of a lithium ion secondary battery exhibits a gradual increase from the start of charging, which, during the charging process, changes to a gradual increase, until the 100% charge level is reached, at which point the battery temperature increases sharply as the same configuration as that of the nickel-cadmium battery.

In an ideal secondary battery, the energy of the current caused to flow in the battery until the 100% charge level is reached is spent in the chemical reaction required for charging, and is not converted to thermal energy.

However, after approaching the 100% charge level, the rate of said chemical reaction becomes slow, the remaining energy being spent in a chemical reaction not related to charging, and converted to thermal energy.

Therefore, after the charge level reaches 100%, the reaction contributing to charging does not occur immediately, gas is formed, and the temperature rises.

When the temperature rises, the speed of the chemical reaction increases, causing the temperature to rise, and this also causes a great deal of gas to be generated.

These phenomena form a vicious circle, and ultimately lead to the destruction of the battery.

If the charging operation is performed repeatedly, the matter inside the battery which contributes to the occurrence of the chemical reaction deteriorates, so that it is not possible to store sufficient energy.

Therefore, as described above, if charging is continued even after the charge level reaches 100%, a problem arises in that the deterioration of internal matter in the battery is accelerated, resulting in a lifetime for the battery considerable shorter than the intended life of the secondary battery.

For that reason, in the past, because of limitation imposed because of the makeup and characteristics of secondary batteries, said charging operation was only possible by means of very limited methods, and it was not possible to solve the problems cited above.

Charging methods in the past have included, for example, the following.

(1) Charging with a minute (trickle) current (for example, a current of 1/10 to 1/20 of the capacity of the battery), and performing no control at the point at which charging is completed.

In this charging method, there is absolutely not control of the current, and the charging time generally ends in approximately 10 hours to 15 hours.

For this reason, in this charging method, the charging time becomes extremely long, and there is a danger or overcharging.

(2) Charging with a small current (for example, a current of 1/3 to 1/10 of the capacity of the battery), with the end of controlled as being after a preestablished time, which was generally 5 hours to 10 hours.

In this charging method, the charging time becomes long, and there is a danger of temperature rise caused by excessive current in the case in which the battery had some remaining capacity.

(3) Charging with a relatively large current (for example, a current of 1/3 to 1/1 of the battery capacity), and stopping the charging when the voltage value of the battery being charged falls below a given value (generally approximately 10 mV per cell).

The time for completion of the charging is approximately 1 hour, and this is what is known as relatively fast charging.

In this charging method, while the charging time is relatively short, there is a great danger of excessive current, and a large rise in temperature.

Additionally, in this method, it is impossible to detect the completion of charging in batteries having characteristics such as were described in FIG. 2 and FIG. 3.

For this reason, in the present invention, in consideration of the characteristics of a variety of previous secondary battery types, characteristics heretofore unknown, which are common to secondary batteries are employed in achieving the above-stated object of the present invention.

Specifically, in the high-speed charging method for secondary batteries of the present invention, a method and an apparatus for high-speed charging of secondary batteries is provided which makes possible the reliable stopping of charging of any type of secondary battery at a point in the charge level of 95% to 100%, charging at current levels ranging from small to large (for example, equal to or greater than the capacity of the battery), and in particular, high-speed charging, for example at a charge rate of 2 C in an extremely short period of time, for example 15 minutes or less.

What follows is a description of the high-speed charging method and apparatus of the present invention, with reference made to drawings.

Figure 1:
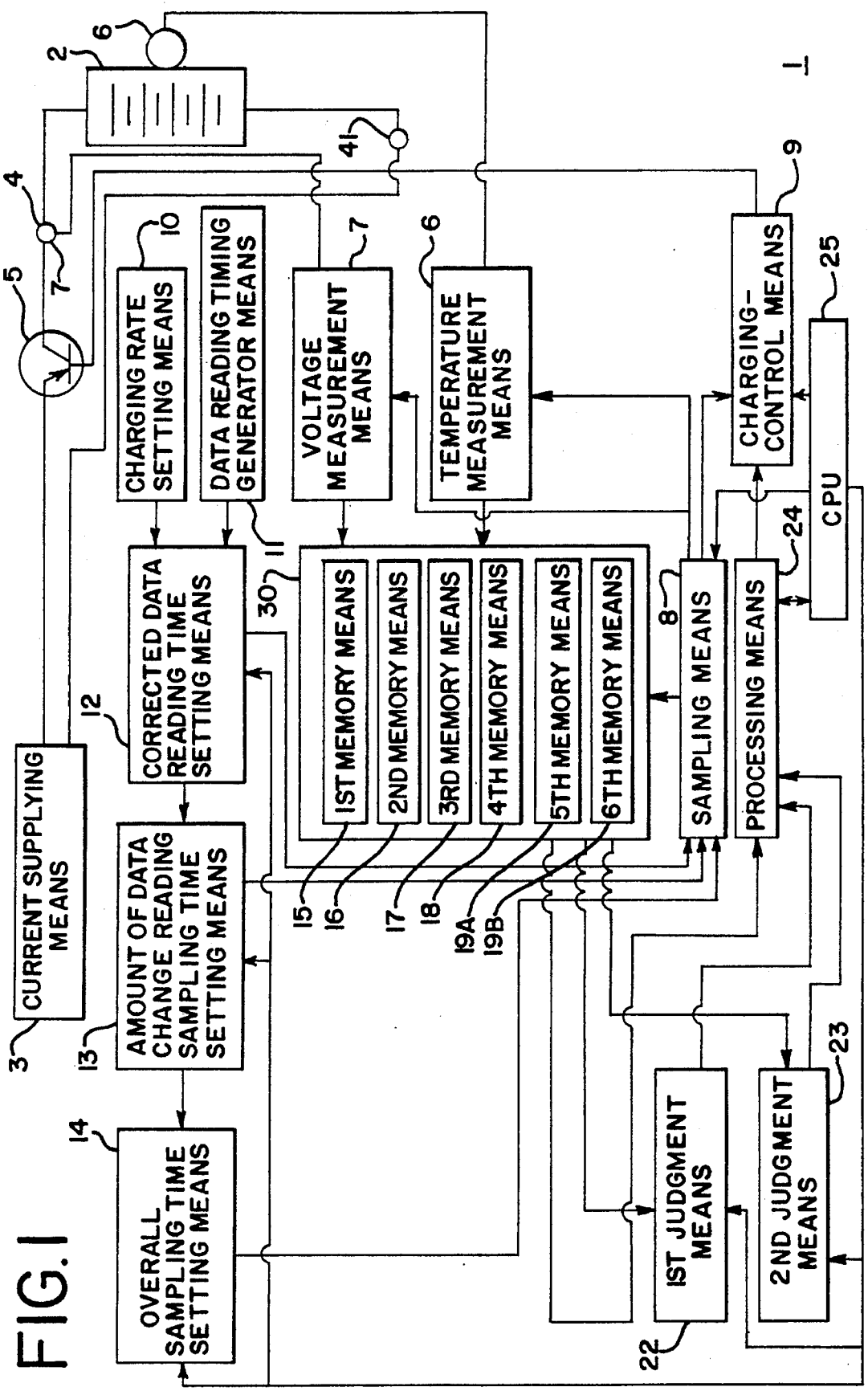
FIG. 1 is a block diagram which shows the configuration of a specific example of the high-speed charging apparatus for secondary batteries of the present invention.

FIG. 1 shows a block diagram of one concrete example of the configuration of the high-speed charging apparatus for secondary batteries of the present invention, which basically shows an apparatus for high-speed charging of secondary batteries 1, comprising, a current-supplying means 3 which supplies electrical current to the cells of a secondary battery 2 requiring charging, a switch means 5 provided between said current-supplying means 3 and terminal 4 of said secondary battery being charged, a temperature measurement means 6 which measures the temperature of said cells of said secondary battery 2, a voltage measurement means 7 which measures the terminal voltage of said secondary battery, a sampling means 8 which operates said temperature-measurement means 6 and/or said voltage measurement means 7 to measure the temperature and/or the voltage of said cells of said secondary battery 2 with the desired sampling interval, a storage device 30 which stores each of the data sampled by said sampling means 8, and which executes the required calculations on said stored data, storing the results in a separate memory means, a charging-control means 9 which is connected to said sampling means and controls said switch means 5, a charging rate setting means 10 which sets the charging rate C, a basic data reading timing generator means 11 which, based on the charging rate C set by said charging rate setting means 10, generates the predetermined basic data reading time tb, a corrected data reading time setting means 12 which, set the corrected data reading time tc, the value of which is characteristic to said charging rate C, an amount of data change reading sampling time setting means 13 which multiplies the corrected data reading time tc by a preestablished value L to set the temperature data amount of change reading sampling time ts, an overall sampling time setting means 14 which multiplies said data amount of change reading sampling time ts by a preestablished value M to set the overall sampling time t, a 1st memory means 15 which stores the values of temperature data dtn measured each said corrected data reading time tc, a 2nd memory means 16 which stores the data Dtn which is the summation of the L values of temperature data dtn stored in said 1st memory means 15, a 3rd memory means 17 which, from the data Dtn stored in said 2nd memory means, stores the difference ΔDt between data Dt(n−1) measured at the previous amount of change reading sampling time ts and data Dtn measured at the current amount of change reading sampling time ts+1, this difference value being ΔDt (where ΔDt=Dtn−Dt(n−1)), a 4th memory means 18 which stores the amount of temperature data change ΔTDt obtained by taking the summation of each of the M amounts of temperature data obtained at each amount of change reading sampling time (ts) in the overall amount of change reading sampling time t (where t=ts×M) obtained by repeating said amount of change reading sampling time (ts) M the required number of M times, a 5th memory means 19(A) which, with regard to the temperature data amount of change ΔTDt stored in said 4th memory means 18, stores the change ratio ΔHt calculated between the amount of temperature data change ΔTDtn at the 1st overall amount of change reading sampling time tn and the amount of temperature data change ΔTDt(n+1) at the 2nd overall amount of change reading sampling time tn+1, which is formed by shifting the time by one amount of change reading sampling time (ts), said change ratio being ΔHt (where ΔHt=ΔTDt(n+1)/ΔTDtn), a 1st judgment means 22 which compares said temperature change ratio ΔHt which are stored in said 5th memory means 19(A) between said amounts of temperature change with a preestablished reference value K, and if said change ratio ΔHtm between said amounts of temperature change exceeds said reference value K, outputs a signal which stops said charging, a 6th memory means 19(B) which, with regard to the terminal voltage data amount of change ΔTDv stored in said 4th memory means, stores the difference calculated between the amount of temperature data change ΔTDvn at the 1st overall amount of change reading sampling time tn and the amount of temperature data change ΔTDv(n+1) at the 2nd overall amount of change reading sampling time tn+1, which is formed by shifting the time by one amount of change reading sampling time (ts), said difference being ΔHvm (where ΔHvm=Hv(m+1)−Hvm), a 2nd judgment means 23 which, with regard to each the m values of voltage data amounts of change differences ΔHv1 to ΔHvm stored continuously in said 6th memory means 19(B), makes a judgment as to whether the values are positive (zero or larger) or negative (less than zero), and which performs said judgment processing in the sequence of occurrence of said voltage data amount of change differences ΔHv1 to ΔHvm, and if said voltage data amount of change difference ΔHv is a negative value a preestablished number of times S or more continuously, output s signal which stops said charging operation, and a processing means 24 which processes each of the individual data stored by each of said means, and a central processing means 25 which controls the operation of each said means.

In the present invention, one and the same high-speed secondary battery charging apparatus is capable of performing high-speed charging of, as described above, nickel-cadmium batteries, a nickel-hydrogen batteries, or a lithium ion batteries.

One of the characteristics of the present invention is that, for the purpose of performing precise, high-speed charging of any secondary battery, a comprehensive study of the characteristics of said secondary batteries was made, and the configuration was made so as to enable accurate and quick detection of changes in characteristics values of said secondary batteries, enabling not only reliable detection of the point at which said secondary batteries reach a condition in which they are as close as can be to the 100% charge level, but also stopping of the charging process at that point, and to enable this performance, the present invention is configured to perform measurement of voltage data and/or voltage data of said secondary batteries at an extremely short interval, the results of these measurements being used to effectively determine the charging condition of said secondary batteries.

More specifically, in the charging operation performed by the present invention, in order to make a judgment of whether or not the charge level of 100% or the 100% region has been reached, regardless of which type of secondary battery is being charged, as shown in FIG. 2 through FIG. 4, it is appropriate to detect the point of the occurrence of a peak value in the voltage data, or, in the temperature data, to detect the point at which the temperature rises at a sudden high rate.

Figure 5A:
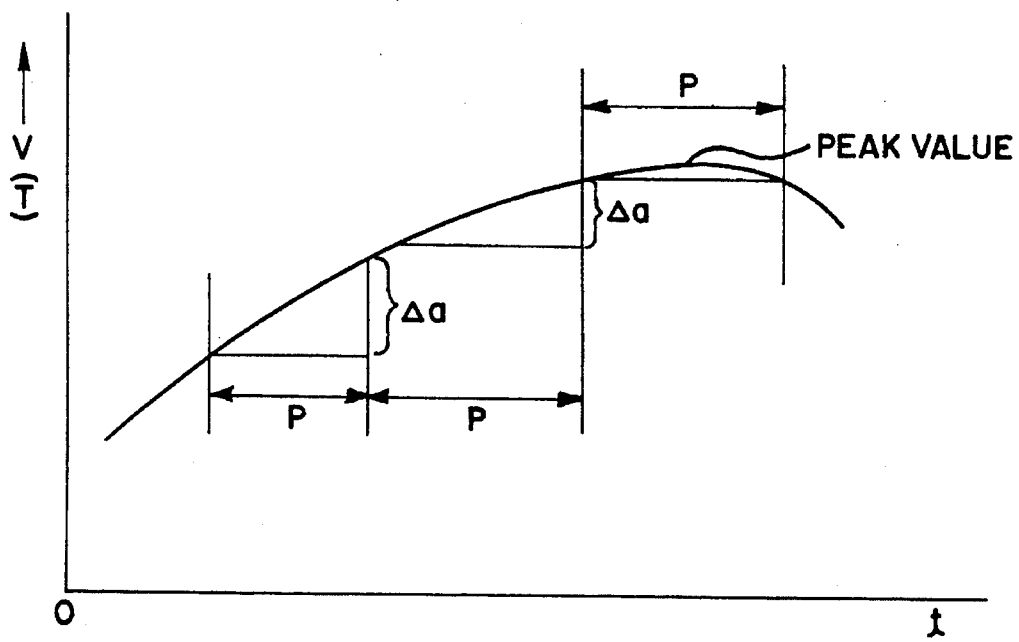
FIG. 5 (A) is a drawing which shows a curve of measurement data and the relationship of the sampling interval p to the amount of change, and FIG. 5 (B) is a drawing which shows the relationship of the measurement data sampling period t and the measurement data amount of change reading sampling time (ts) for the present invention.
Figure 5B:
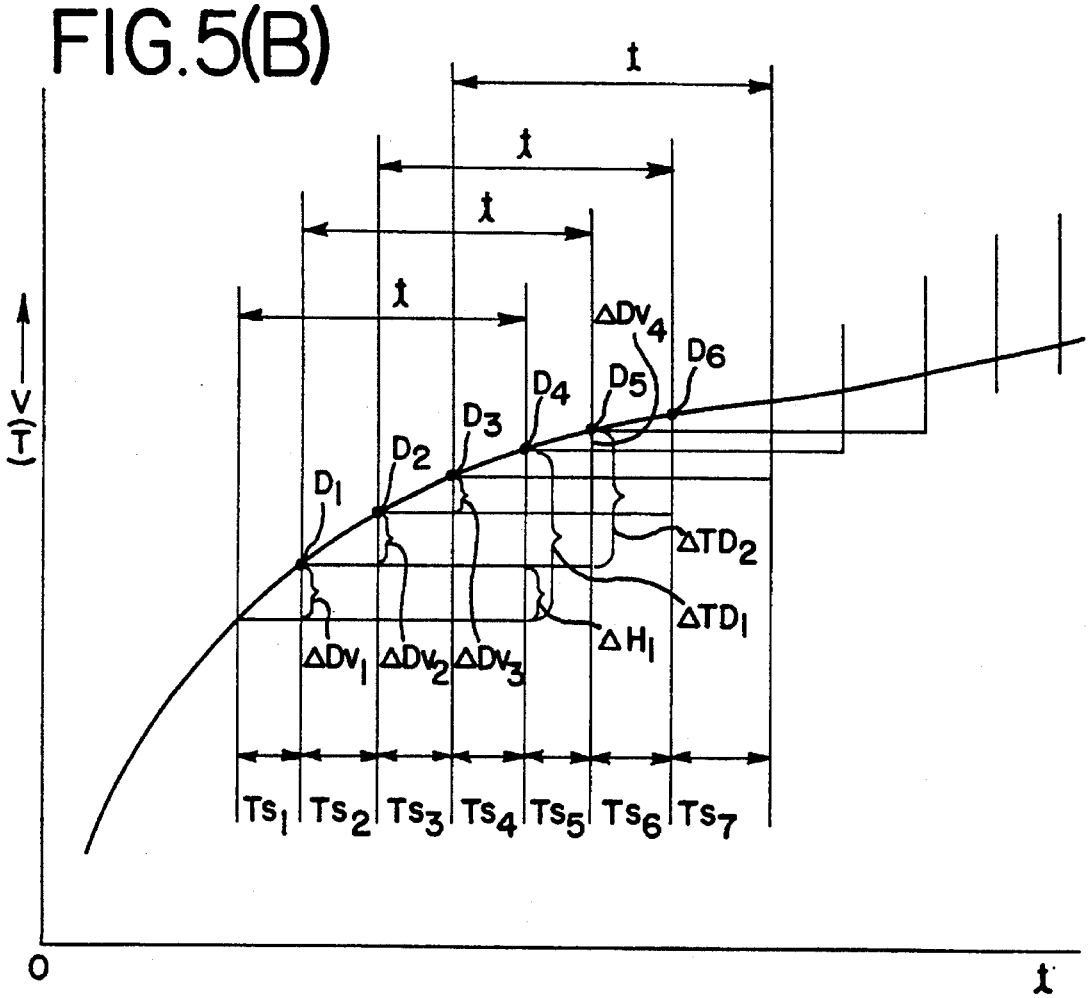

For example, in measuring voltage data, as shown in FIG. 5 (A), with previous methods, to make the amount of data change Δa large, it is necessary to make the sampling interval p a somewhat long interval.

However, in charging, if the sampling interval p is long, as shown in FIG. 5 (A), there is the problem of losing the opportunity of detecting the peak in the voltage data, thus making it impossible to detect the proper time to stop charging.

On the other hand, if the sampling interval p is made short, the cost of reading the amounts of data change Δa becomes very high, making it impossible to implement an economic system.

For this reason, in the present invention, the basic data reading time tb required to read data is set, a corrected data reading time tc, which is characteristic to the charging rate C is set based on that time and the charging rate, the terminal voltage of said battery and/or surface temperature of said battery is measured one time each within said corrected data reading time tc, these operations being repeated a preestablished number of times L, the voltage data and/or temperature data from which operations are summed separately, the summed data being taken as the variable Dn with respect to the amount of data change reading sampling time ts (where ts=L×tc). Refer to the graph of FIG. 5 (B).

By virtue of these operations, the apparent accuracy of the measured voltage data and/or temperature data is thus multiplied by L.

A 3rd memory means 17 which, from the data Dtn stored in said 2nd memory means, stores the difference between data Dt(n−1) measured at the previous amount of change reading sampling time ts and data Dtn measured at the current amount of change reading sampling time ts+1, this difference value being ΔD (where ΔD=Dtn−D(n−1));

Next, in the present invention, the difference between the variable Dn at said amount of data change reading sampling time ts (where ts=L×tc) and the variable D(n−1) at said previous amount of data change reading sampling time ts is determined as ΔD (where ΔD=Dtn−D(n−1)), the results being sequentially stored in 3rd memory means 17.

Subsequently, these operations are repeated a preestablished number of times M, the total, as shown in FIG. 5 (B), being taken as the amount of voltage data and/or temperature data change ΔTD for the overall said amount of change reading sampling time t (where t=ts×M).

After that, as shown in FIG. 5 (B), the overall said amount of change reading sampling time t and said data amount of change reading sampling time ts are each shifted by one at a time, as the amount of temperature data and/or voltage data change ΔTD1 to ΔTDm for respective overall amount of change reading sampling times t1 to tm is determined.

Therefore, ultimately in the present invention, the time of measuring the voltage data and/or temperature data amount of change ΔTD is expressed as t=M×L×tb×A/C.

Therefore, in the present invention, by properly selecting the values of the above-stated constants M and L, it is possible, with a low-cost reading apparatus, not only to read measurement data with high accuracy, but also, because the range obtained by shifting said overall amount of change reading sampling time (ts) is shifted one at a time is set, so that said voltage data and/or temperature data amount of change ΔTD is obtained at an interval which is said amount of change reading sampling time (ts), it is possible to obtain the large amount of change data ΔTD which is sampled at the relatively long interval of the overall amount of change reading sampling time t, within the relative short time which is the amount of data change sampling time (ts), it is possible to determine at a short sampling interval whether or not to stop charging, resulting in a detailed and precise charging operation.

In addition, in the present-invention, for the purpose of performing high-speed charging, and in consideration of the fact that said secondary batteries of differing types are used, the measurement conditions are changed, the configuration is made such that, according to the the speed of charging, or what is normally called the charging rate, so that high or low charging speeds can be employed to obtain the optimum charging operation.

The apparatus for high-speed charging of secondary batteries 1 of the present invention, is provided with a switch means 5 which is connected between the terminal 4 of the secondary battery being charged and the current-supplying means 3 for the purpose of supplying charging current to a secondary battery 2 requiring charging, said switch means 5 being controlled by said charging-control means 9, so that the current from said current-supplying means 3 is on and off controlled.

In performing charging of said secondary battery 2, said switch means 5 is turned on, so that current flows from said current-supplying means 3 to said secondary battery 2 of said secondary battery, and when the charge level of said secondary battery reaches 100% or when, as described later, a condition is detected which indicates that said secondary battery is approaching the 100% charge level, said switch means 5 is switched off, and the current from said current-supplying means 3 to said secondary battery 2 is cut off.

In the present invention, as described later, when measuring voltage and/or temperature at each sampling time, it is desirable to make the measurement with said charging current cut off, and in this case, when measuring the above-stated data, intermittent drive is used, so that said switch means 5 is cut off in synchronization with the sampling signal of said sampling times.

In addition, from the measurement results of each of said data, when a measured data is detected which is outside the range of normally allowed values, it is also possible to turn said switch means 5 off, so that the charging operation is stopped.

The reason for this is that, in the present invention, in measuring the above-stated voltage and/or temperature, if a measurement is made with the charging current flowing from said current-supplying means 3 to said secondary battery 2, because there will not be a uniform reaction occurring within the battery, the voltage value will include an error, making the acquisition of accurate measurement data impossible.

As described above, when a measurement is performed while charging current is flowing, it is impossible to avoid contact resistance between said secondary battery and the charging apparatus, so that, for example, a voltage drop will develop across the contact resistance due to the charging current, this also making it difficult to obtain accurate measurement data.

Next, in the present invention, a microcomputer is used to measure a large amount of terminal voltage and battery surface temperature voltage for the secondary battery in an extremely short period of time, and to analyze the results of these measurements, making judgments as to whether or not the secondary battery has reached a charge level of 100% or the region near 100% as it tracks the minute variations of secondary battery characteristic values.

Furthermore, in the present invention, the configuration is such that even if the charging rate C, which is a charging condition, is varied, it is possible to complete precise charging in a short period of time.

For this reason, in the apparatus for high-speed charging of secondary batteries 1 of the present invention, there is provided a charging rate setting means 10, for the purpose of adjusting the speed of charging, that is the charging rate C, to the characteristics charging rate of the secondary battery to be charged.

By virtue of the above, it is possible to set the sampling period for measurement during the charging operation to a value that is optimized with respect to the charging rate C for said secondary battery.

In the apparatus for high-speed charging of secondary batteries 1 of the present invention, there is provided as part of the circuit configuration a basic data reading timing generator means 11 which sets the basic data reading time tb, the basic data reading time tb generated by said basic data reading timing generator means 11 being adjusted by corrected data reading time setting means 12, based on the charging rate C set by said charging rate setting means 10, so that the corrected data reading time tc is characteristic to the charge rate C of said secondary battery.

In this case, the corrected data reading time tc, data change $\Delta TD$ at said overall amount of change reading sampling time t ($t=t \times M$) being determined, and result for voltage data and temperature data being stored separately in 4th memory means 18.

Because subsequent operation differs slightly between voltage data and temperature data, the operation for voltage data will be described first.

First, using the amount of voltage data change $\Delta TDv$ which was stored in said 4th memory means 18, the difference between the voltage amount of change $\Delta TDv1$ measured from over the said overall amount of change reading sampling time established as running from said 1st sampling time (ts1) to the sampling time (tsM) for the M-th sampling, and the voltage amount of change $\Delta TDv2$ measured from over the overall amount of change reading sampling time established as running from said 2nd sampling time (ts2) to the sampling time (tsM+1) for the M+1-th sampling is determined by calculation, said calculated difference $\Delta Hv$ being stored in a 5th memory means.

These operations are performed continuously, and a general description of the above operations is that, with respect to the measured amount of voltage change $\Delta TDvn$ at a given overall amount of voltage data change reading sampling time tn, said amount of change reading sampling time (ts) is shifted one at a time, while continuous repeated calculation is performed of the amount of voltage changes $\Delta TDvn$ to $\Delta TDv(n+x)$ at said overall amount of change sampling reading times $t(n+1)$ to $t(n+x)$, which are derived constantly by summing M of said amount of change reading sampling times (ts), and, similar to as described previously, these are stored in said 4th memory means 18, while the amount of voltage changes $\Delta TDvn$ and $\Delta TDv(n+1)$ occurring at adjacent overall amount of change reading sampling times tn and $t(n+1)$ are used to calculate the difference value $\Delta Hvn$ (where $\Delta Hvn=\Delta TDv(n+1)-\Delta TDvn$), this being stored in 6th memory means 19(B).

With respect to the m continuously obtained values of amount of voltage change differences $\Delta Hv1$ to $\Delta Hvm$, a judgment is made by 2nd judgment means 23 as to whether a value is positive (zero or greater) or negative (less than zero), and said 2nd judgment means 23 further executes a judgment processing in the sequence of occurrence of said amount of voltage change differences $\Delta Hv1$ to $\Delta Hvm$, to make a judgment as to whether or not at least a preestablished number of continuous values of said amount of voltage change difference $\Delta Hv$ is or is not negative, and if S continuous values of said amount of voltage change difference $\Delta Hv$ are negative, a judgment is made that said secondary battery has reached the 100% charge level or is in the 100% charge level region, and a signal is output for the purpose of stopping said charging operation, which causes said charging-control means 9 to operate to turn switch means 5 off, and stop the charging operation with respect to said secondary battery.

Figure 6A:
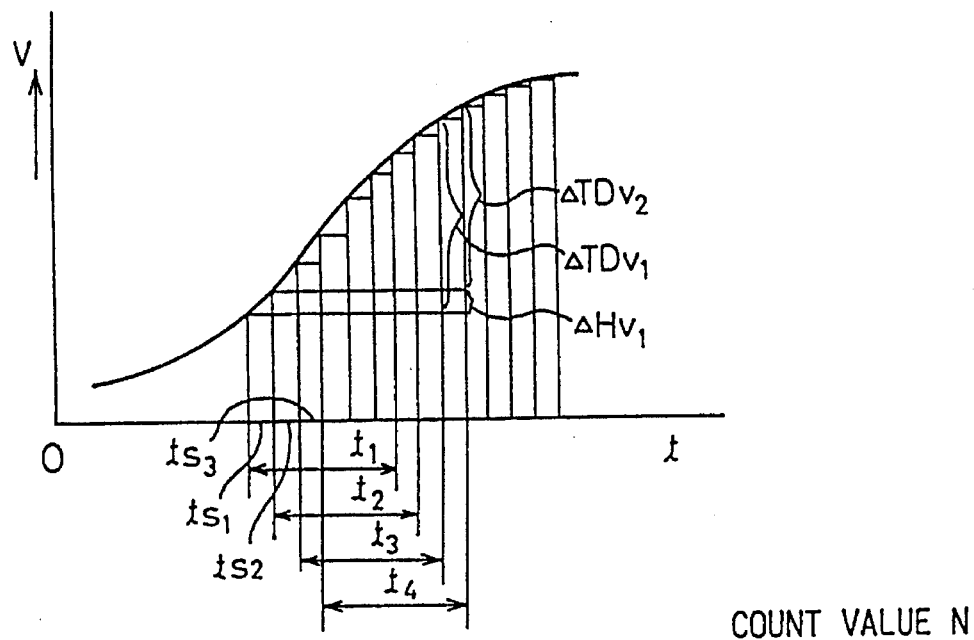
FIG. 6 (A) is a drawing which describes one example of analysis of the voltage measurement data and condition of change thereof in the present invention, and FIG. 6 (B) is a drawing which describes one example of analysis of the temperature measurement data and condition of change thereof in the present invention

Essentially, as shown in FIG. 6A, when an approach is made to the fully charged condition, the rising curve of said voltage data becomes gradual, and the above-mentioned difference becomes either zero or negative.

Then, in the case in which said difference value is either zero or negative, an appropriate counter value is advanced by 1, and when said counter value reaches a given value of, for example, 3, said charging operation is stopped.

What this means is that with the method of stopping the charging as described above in the present invention, if the difference between the previous value of voltage of the secondary battery and the current value of voltage of the secondary battery is either zero or negative for 3 times in a row, it will be assumed that the secondary battery has reached a 100% charge level, and the charging which is set in accordance with said charging rate C and said basic data reading time tb, can also be expressed as $tc=tb \times A/C$ (where A is a constant).

The above constant A can be set as appropriate, for example, as a positive integer such as 16.

In the present invention, during the charging of the battery, the battery terminal voltage or battery temperature is measured by means of said sampling means 8 at least one time during said corrected reading time tc, the voltage data or temperature data d at that point being separately stored in an appropriate 1st memory means 15, said measurement operations being repeated continuously a preestablished number of times L, with the plurality of voltage data obtained at each of the corrected reading times tc being summed, the amount of change Dn in the resulting voltage data or temperature data at the amount of change sampling time ts (where $ts=L \times tc$), for example Dvn and Dtn, being stored in an appropriate 2nd memory means 16.

Next, in the present invention the difference between the amount of change D1 at the 1st sampling time (ts1), which was stored in the 2nd memory means 16 and the amount of change D2 at the next, 2nd, sampling time (ts2), which was stored in said 2nd memory means 16 is determined by calculation, the results being the differences in amount of change $\Delta D$, which are stored in 3rd memory means 17.

In the present invention, during a preestablished period, which is the overall amount of data change reading sampling time t, these operations are repeated continuously a preestablished M number of times, with the overall amount of data change reading sampling time t expressed as $t=t \times M$.

In the present invention, the measured values of data $\Delta D1$ to $\Delta DM$ obtained by performing repeated continuous measurements during said amount of data change reading sampling time are summed, the amount of voltage operation will be stopped.

In the case of measuring the surface temperature of the secondary battery, of the temperature data amount of change values $\Delta TDt$ stored in said 4th memory means 18, a calculation is performed to determine the change ratio between the temperature data amount of change $\Delta TDtn$ at the 1st overall amount of change reading sampling time tn and the 2nd overall amount of change reading sampling time $t(n+1)$, which is formed by shifting by said amount of change reading sampling time (ts) at a time, this change ratio of $\Delta Ht$ (where $\Delta Ht=\Delta TDt(n+1)/\Delta TDtn$) being stored in 5th memory means 19(A).

Subsequently, said change ratio ΔHt between amounts of temperature change is compared by 1st judgment means 22 with a preestablished reference value K, and if said change ratio ΔHt between amounts of temperature change exceeds said reference value K, a signal is output from 1st judgment means 22 for the purpose of stopping said charging operation.

Figure 6B:
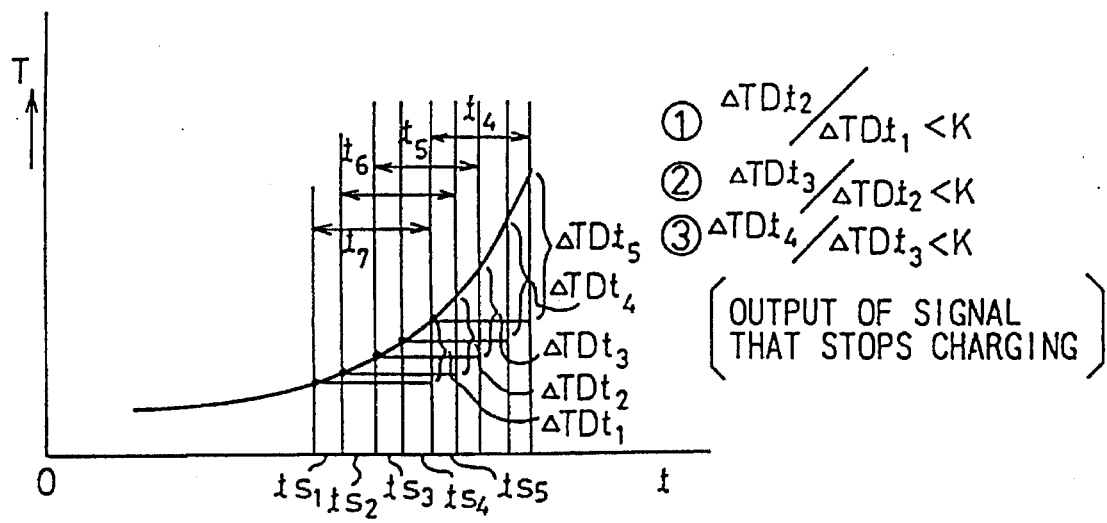

Thus, as shown in FIG. 6B, in the region of full charge, since in the rising curve of measured temperatures of the secondary battery suddenly increases, the ratios of ΔTDt(n+1) and ΔTDtn for each amount of change reading sampling time (ts) is taken, and if said ratio is greater than a preestablished reference value K, it is assumed that said secondary battery has reached 100% charge level, and the charging operation is stopped.

In said 1st judgment means 22, if said change ratio ΔHt between amounts of temperature change differences exceeds a preestablished reference value K, the judgment will be made that said secondary battery has reached 100% charge level or the 100% charge level region, and a signal will be output for the purpose of stopping said charging operation, the result being that said charging-control means 9 is operated to turn said switch means 5 off, thereby stopping the charging operation of said secondary battery.

With regard to the present invention, although the method of measuring the terminal voltage of said secondary battery during charging and stopping the charging operation if the judgment is made that the charge level has reached 100% or the 100% region, and the method of measuring the temperature of said secondary battery during charging and stopping the charging operation if the judgment is made that the charge level has reached 100% or the 100% region were described separately, in the present invention it is possible to combine these two methods, thereby enabling a more accurate determination of the charge level.

Additionally, in the present invention, although the basic method is when measuring voltage data, to measure the voltage data measured at each amount of change reading sampling time (ts), repeating this M times, thereby accumulating the overall data value during the overall sampling period t (ts×M), using the results to observe the change of said voltage data, in the charging of a secondary battery, when the charge level of said secondary battery is 100% or is in the 100% region, the change in temperature becomes very gradual, so that if the sampling period is made long, it is possible to, for example, detect the peak value on the temperature variation graph, or to accurately and quickly detect such conditions as a dropoff from the peak value, or in addition, the condition in which there is no change from the peak value over a given period of time.

For this reason, in the high-speed charging method for secondary batteries of the present invention, another possible form is that in which, every time a voltage data amount of change ΔTDvn is measured each said amount of change reading sampling time (ts), a difference between that value and the previously determined voltage data amount of change ΔTDv(n−1) is determined, a determination is made as to whether that value is either zero or positive or zero, and if the value is positive, a counter ΔS having a preestablished upper limit value W is reset to zero, but if the value is negative, the current said counter value ΔS is incremented by 1, or a value corresponding to said negative value is added to the ΔS, and if the resulting sum exceeds the preestablished upper limit value W, the charging operation with regard to said secondary battery is stopped.

In the case in which said difference amount is zero, it is possible, for example, to forcibly add a preestablished negative constant Z (for example −2) to said counter value ΔS, so that if the difference value is zero, indicating that the voltage data curve is not changing, it is treated as if it were a negative value for the purposes of processing.

Next, one concrete example of the operating procedure for the high-speed charging method for secondary battery of the present invention will be described, with references made to the flowcharts of FIG. 7 through FIG. 9.

Figure 7:
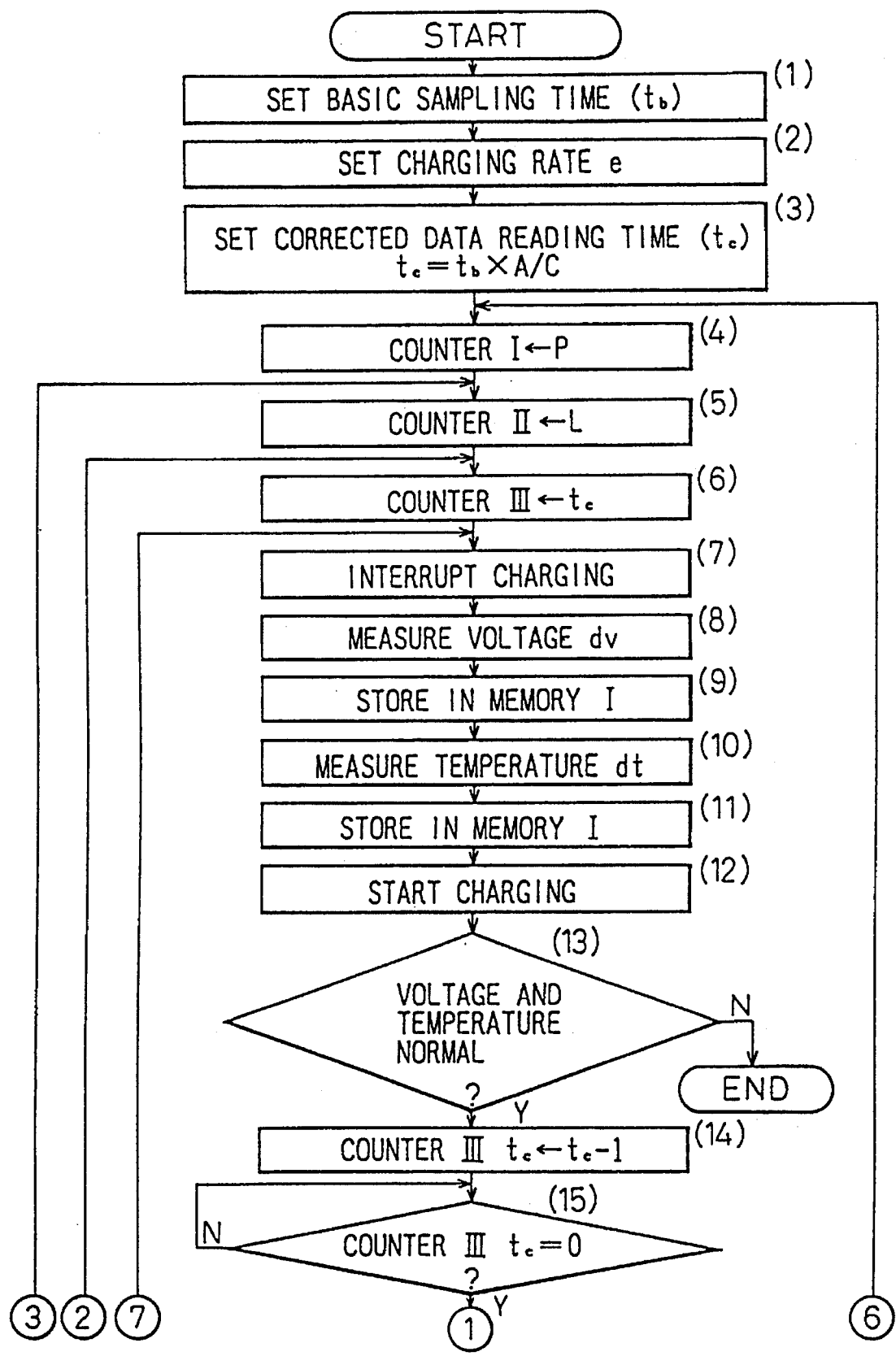
FIG. 7 is a flowchart which shows one example of the procedure in the case of executing the secondary battery charging method of the present invention.
Figure 8:
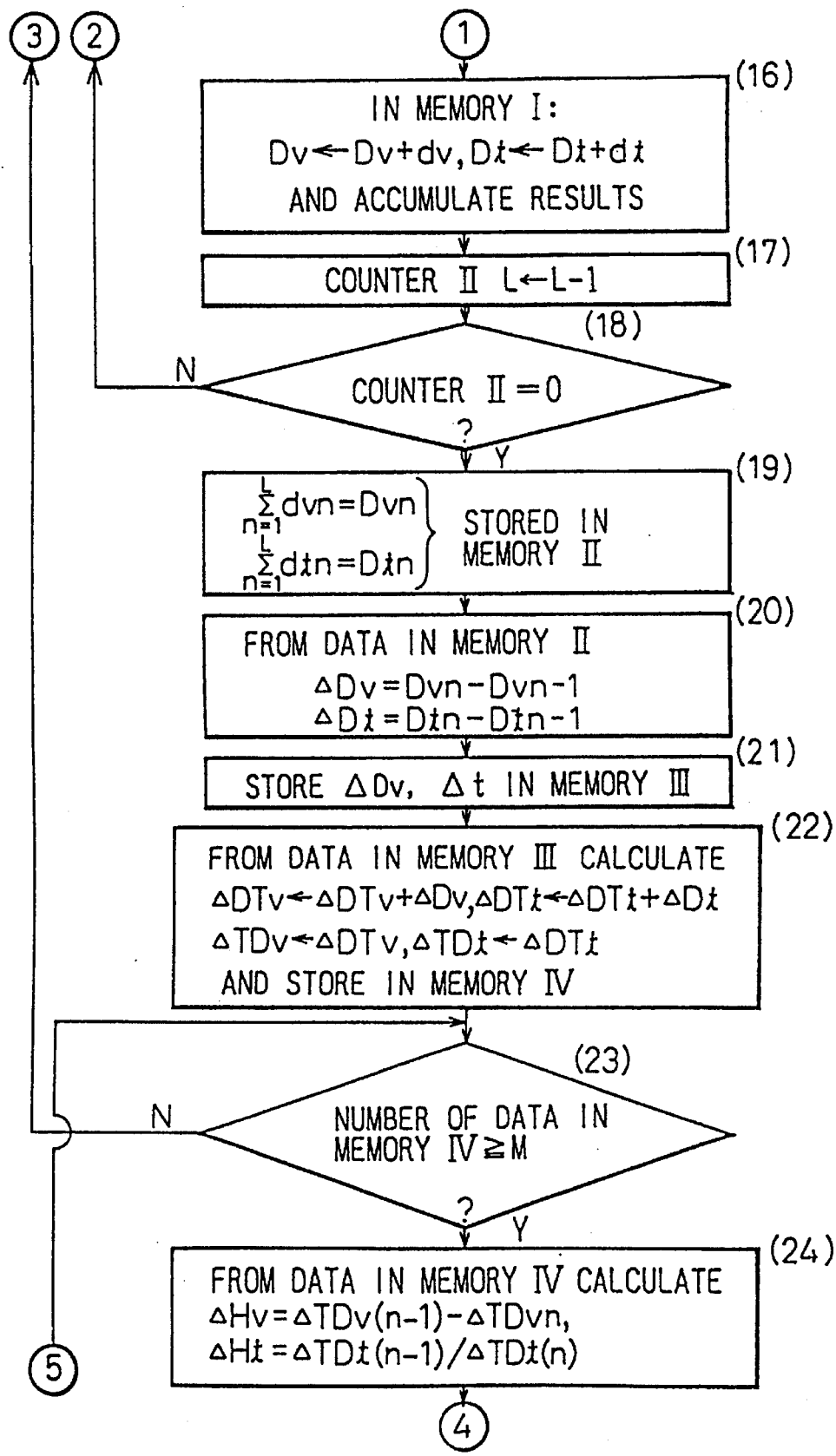
FIG. 8 is a flowchart which shows one example of the procedure in the case of executing the secondary battery charging method of the present invention.
Figure 9:
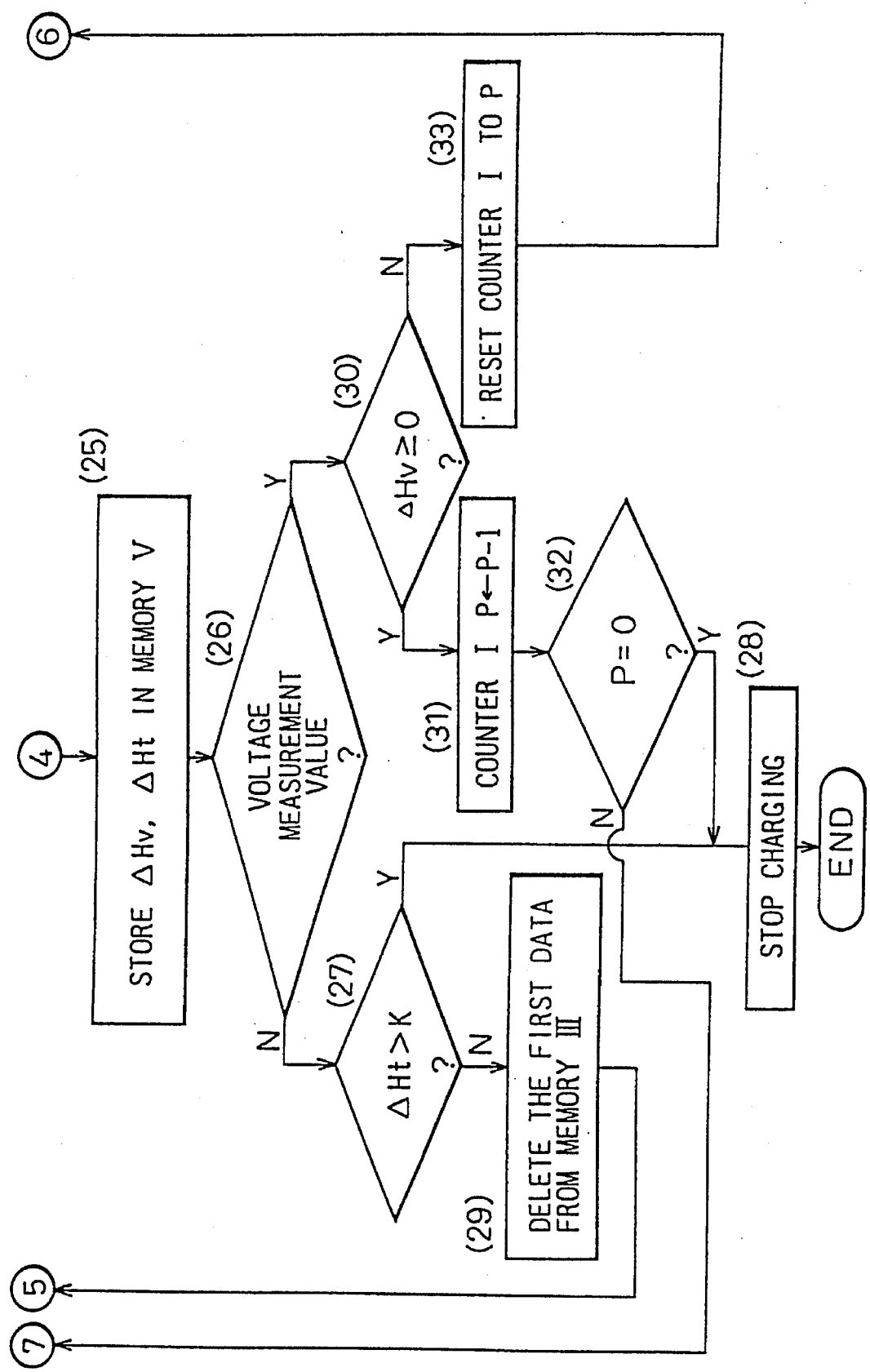
FIG. 9 is a flowchart which shows one example of the procedure in the case of executing the secondary battery charging method of the present invention.

FIG. 7 through FIG. 9 are flowcharts that explain the operation of one specific example of the high-speed charging method for secondary batteries of the present invention. First, at step (1), the basic data reading time tb required to read data is set, operation proceeding to step (2), at which the charging rate C which is a rated value suitable for executing charging with respect to said secondary battery.

In the present invention, in addition to being able to charge secondary batteries having individually differing constructions, there being secondary batteries of the same type but having differing charging rates, it is possible to also, in accordance with the charging rate that is indicated as a specification, by executing sampling of the ideal measurement values, to collect precise data, enabling accurate and high-speed charging.

Next, operation proceeds to step (3), at which the corrected data reading time tc, which is characteristic to the set charging rate C is set in accordance with the set charging rate C and said basic data reading time tb.

Then, at step (4), since in the case in which the measured voltage value amount of change is either zero or negative a preestablished number of times, for example P, in a row, the judgment is made that said secondary battery being charged has reached the 100% charge level or the region of 100% charge level, and said charging operation is stopped, if this occurs, at this step the preestablished value of P is set into the counter I, which counts down.

At step (5), in order to repeat the sampling operation every corrected data reading time tc, which value is characteristics to the charging rate C, for example L times, said preestablished number of times L is set into counter II, which controls said number of repetitions.

Next, operation proceeds to step (6), at which the time data corresponding to the corrected data reading time, which is characteristics to-the charging rate and which is set at step (3), is set into counter III.

After this, at step (7), when measuring the voltage and temperature data of the secondary battery being charged, for the reason described previously, the supply of current to charging said secondary battery is cut off at the instant of the data measurement.

As described previously, the charging current at the time of these data measurements is cut off by turning the switch means 5 which comprises the transistor in FIG. 1 to off.

After that, at step (8), the terminal voltage (dv) of said secondary battery being charged is measured, and at step (9), the results are stored into 1st memory means 15, that is, in memory I.

In the same manner, at step (10), the surface temperature (dt) of said secondary battery being charged is measured, and at step (13), the results are stored into the same 1st memory means 15, that is, into memory I.

Next, operation proceeds to step (12), at which the supply of charging current is starting once again to restart the charging operation, after which at step (13) a judgment is made as to whether or not either the voltage value or the temperature value just measured exceeds the preestablished data limit value, and if said measured data does exceed said limit value, the judgment is made that an abnormal condition has occurred in the secondary battery being charged, and said charging operation is stopped.

If, however, both the voltage value and the temperature value just measured are judged normal at step (13), operation proceeds to step (14), at which the set value of counter III is decremented by 1, and operation proceeds to step (15), at which a judgment is made as to whether or not the value of said counter III is zero, and if it is not zero, a wait is made until the value of counter III is zero, that is, until the corrected data reading time tc has elapsed, and after a verification is made that the value of said counter III is zero, operation proceeds to step (16), at which the values of voltage data dv and temperature data dt obtained from the measurement just mad are added to the respective values of voltage data dv and temperature data dt obtained at the immediately previous measurement, the results being cumulatively stored separately into said 1st memory means 15.

Next, operation proceeds to step (17), at which 1 is subtracted from the setting value L of counter II, and operation proceeds to step (18), where a judgment is made as to whether or not the setting value L of said counter II is zero.

Thus, in the present invention, while voltage data and temperature data are measured at least one time during said corrected data reading time tc, the associated operations are repeated during a preestablished time, that is during the measurement data amount of change reading sampling time (ts), a preestablished number of times, that is, L, which causes repetition of said measurements, said value of L being arbitrarily settable.

Therefore, at step (18), if the setting value L of said counter II is not zero, it means that the required number of measurements has not yet been reached, so that return is made to step (6), at which the above-mentioned steps are repeated.

If, however, at step (18), the setting value L of said counter II is zero, this means that the required number of measurements has been reached, so that operation proceeds to step (19), at which a calculation is performed to determine the sums, Dvn and Dtn, of the voltage and temperature data values that had been stored into 1st memory means 15 L times each corrected data reading time tc, these results being stored separately into 2nd memory means 16 (memory II).

Next, at step (20), using the data that had been stored into said 2nd memory means 16, the differences between the values Dv(n−1) and Dt(n−1) stored into memory II the immediately previous measurement and the values Dvn and Dtn of the current measurement, that is, the amounts of change between the data measured at the current measurement data amount of change reading sampling time (ts) and the data measured at the immediately previous measurement data amount of change reading sampling time (ts−1) are calculated, at the step (21) the resulting ΔDv and ΔTt are stored separately into said 3rd memory means 17 (memory III).

After this, at step (22), using the data ΔDv and ΔDt which had been individually cumulatively stored into 3rd memory means 17, said amount of change data ΔDv and ΔDt obtained at the current measurement data amount of change reading time (ts1) are added respectively to the amounts of change data obtained at the immediately previous measurement data amount of change reading time (ts0), the results of ΔTDv and ΔTDt being stored separately into 4th memory means 18 (memory IV).

At this step (22), said measurement data amount of change reading sampling time (ts) is set a number of times, for example M times, and the accumulated sum of the amount of change data values obtained at each of the sampling times (tsn) is calculated.

For this reason, at step (23), a judgment is made as to whether or not the total number of data stored in said 4th memory means 18 (memory IV) is a preestablished number, for example M, and if the result of this judgment is NO, the judgment is made that the measurement data amount of change reading sampling time (ts) has not been repeated the preestablished number of times M, and return is made to step (5), after which step the above steps are repeated.

If, however, the result of step (23) is YES, operation proceeds to step (24), at which a calculation is made, with regard to the measured voltage data, from the overall amount of change data which had been stored into said 4th memory means 18, to determine the difference value ΔHv (where ΔHv=ΔTDv(n−1)−ΔTDvn) between the amount of change from the immediately previous measurement data, that is, the overall amount of data change ΔTDvn, which is based on the M data measurements at said measurement data amount of change reading sampling times (ts1) to (tsm), and the amount of change from the current measurement data, that is, the overall amount of change ΔTDv(n−1), which is based on the M data measurements of said measurement data amount of change reading sampling times (ts0) to (tsM−1), and at which also a calculation is made, with regard to the measured temperature data, from the overall amount of change data which had been stored into said 4th memory means 18, to determine the change ratio value ΔHt (where ΔHt=ΔTDt(n−1)/ΔTDtn) between the amount of change from the immediately previous measurement data, that is the overall amount of data change ΔTDtn, which is based on the M data measurements at said measurement data amount of change reading sampling times (ts1) to (tsm) and the amount of change from the current measurement data, that is the overall amount of data change ΔTDtn−1, which is based on the M data measurements of said measurement data amount of change reading sampling times (ts0) to (tsM−1), the results, ΔHv and ΔHt, of said calculations being stored, respectively, in 6th memory means 19(B) (memory VI) and 5th memory means 19(A) (memory V).

After that, at step (26), a judgment is made as to whether or not measurement data is voltage data, and if the result is NO, operation proceeds to step (27), at which, as shown in FIG. 6B, a judgment is made as to whether or not said overall amount of change, ΔHt, of said measurement data is larger than a preestablished value, for example the value K, and if the result is YES, operation proceeds to step (28).

Thus, the overall sum of said temperature data amounts of change ΔTDtn over the M times of measurement data amount of change reading sampling time (ts1) to (tsM) is shift one said measurement data amount of change reading sampling time (ts) at a time, and if the change ratio with respect to the overall sum said temperature data amounts of change ΔTDt(n+1) over the M times of measurement data amount of change reading sampling time (ts2) to (tsM+1) is large, indicating that the rate of rise of said temperature measurement data has increased over a short period of time, the judgment is made that said secondary battery being charged has reached the 100% charge level or the region of the 100% charge level, and the charging operation is stopped at this point.

The preestablished value K can be set as desired, and in the present invention, it is set as a value of, for example, 2 or greater.

That is, in the present invention, as shown in FIG. 2 through FIG. 4, for a secondary battery of any configuration, in the case in which the charge level either reaches 100% or the region of 100%, or exceeds the 100% level, since the measured temperature data rate of rise changes suddenly from its previous gradual increase to a rapid rate of rise, this condition is detected, enabling detection the reaching of the 100% level or the region of 100% charge level, or the exceeding of the 100% charge level.

If at step (27) the judgments result is NO, operation proceeds to step (29), at which, for the purpose of determining the overall amount temperature measurement data amount of change, $\Delta TDt(n+2)$ for the M temperature data over the measurement data amount of change reading sampling time (ts3) to (tsM+2) by shifting said measurement data amount of change reading sampling time (ts) one at a time, after first deleting the first of the M temperature measurement data currently stored in memory V, return is made to step (23), after which the above operations are repeated.

At step (28), if the result was YES, the operation proceeds to step (30), at which a judgment is made as to whether the change in said overall voltage data amount of change, that is $\Delta Hv$, is zero or negative less than zero, and if the result was YES, operation proceeds to step (31), at which the setting value P of counter I is decremented by 1, and then to step (32), at which a judgment is made as to whether the setting value P of said counter is P, and if the result is YES, operation proceeds to step (28), at which the charging operation is stopped. When the result was NO at step (32), return is made to step (7), after which the above operations are repeated.

Thus, in the present invention, as shown in FIG. 2 through FIG. 4, for a secondary battery of any configuration, if the charge level reaches 100% or the region of 100% or exceeds 100%, the measured voltage data which had previously been rising is seen to start to fall or remain unchanged.

Therefore, in the present invention, for any secondary battery, to detect the condition in which the charge level has reached 100% or the 100% region, a judgment is made as to whether the overall change in the amount of change, that is, the difference amount $\Delta Hv$ is zero or negative, and further a determination of whether the difference value $\Delta Hv$ has been zero or negative for P times in a row, and if so, the judgment is made that said secondary battery has reached the charge level of 100% or the region of charge level 100%, and the charging operation is then stopped.

In the present invention, the setting value P of said counter I can be established arbitrarily as desired, for example it can be set to a P value of 3.

Therefore, in this case, although if said difference amount $\Delta Hv$ is zero or negative for 3 times in a row, the judgment is made that the charge level of said secondary battery has reached 100% or has reached the 100% region, and the charging operation will be stopped, if in any 3 consecutive measurements the difference value $\Delta Hv$ is positive even one time, the setting value of said counter I is reset to the original setting value P and the above-stated judgment is repeated.

On the other hand, at step (30), if the result was NO, in step (33) the setting value of counter I is reset to P, and operation returns to step (4), and thereafter each of the above-stated steps is repeated.

While in the above-described specific example of the present invention, said count I is set to an initial value of P, and counts down sequentially, in accordance with the result of measurements, so that when the setting value P is 0 the judgment is made that the charge level of the secondary battery is 100%, it is also possible to reverse this, by setting said counter I to an initial value of 0 and having said counter count up sequentially according to the results of measurements, and when the setting value of said counter I reached a preestablished value of P, to make the judgment that the charge level of the secondary battery is 100%.

However, in either of the above-described methods, during charging, there is a danger that the charging operation will be stopped if for some reason the variation in the difference values of said data is zero or negative three times consecutively, even at a point at which the charge level is not that high, so that to solve this problem, in the present invention, since the output voltage of the various secondary batteries in the region of 100% is known beforehand, it is desirable to make the configuration such that the output voltage of said secondary battery is constantly measured and the results monitored, so that the above-described calculation method is only valid in the case in which said output voltage is above 70% to 80% of the secondary battery's nominal output.

In the high-speed charging method for secondary batteries of the present invention, as described above, it is sufficient to at least measure the terminal voltage data of said secondary battery, so that the amount of change in the terminal voltage data are detected, and it is also possible to measure the surface temperature data of said secondary battery, so that the change ratio in the surface temperature is detected.

In addition, in the present invention, it is also possible to make use of both temperature data and voltage data to estimate the charge level.

In the present invention, for example, the basic data reading time tb required for reading data is set to 0.75 second, counter II value L is set to 4, the charge rate C at which said secondary battery is to be charged is set to 4, and constant A is set to 16.

In addition, at step (23) if the number of repetitions M is set to 8, said measurement data amount of change reading sampling time (ts) will be 12 seconds, and the time required for 8 repetitions of the measurement data amount of change reading sampling time (ts) will be 96 seconds.

In the present invention, therefore, in the actual example given above, the measurement of either voltage or temperature will require a considerable amount time, and in such cases it is also possible, instead of repeating the above-stated measurement data amount of change reading sampling time (ts) M times, to use individual values of the amount of change $\Delta Dv$ and $\Delta Dt$ to judge the charge level.

That is, in the charging method of the present invention, in the case in which said secondary battery has a considerable residual capacity, there is a possibility that 100% charge level will be reached in a short period of time, and since if the charging is continued without noticing this, the temperature will rise, leading to a danger of deterioration of the secondary battery, to prevent this danger, it is desirable to provide safety measures in addition to the basic charging method of the present invention.

Another specific example of the present invention will be described, with references made to the flowcharts of FIG. 10 and FIG. 11.

Figure 10:
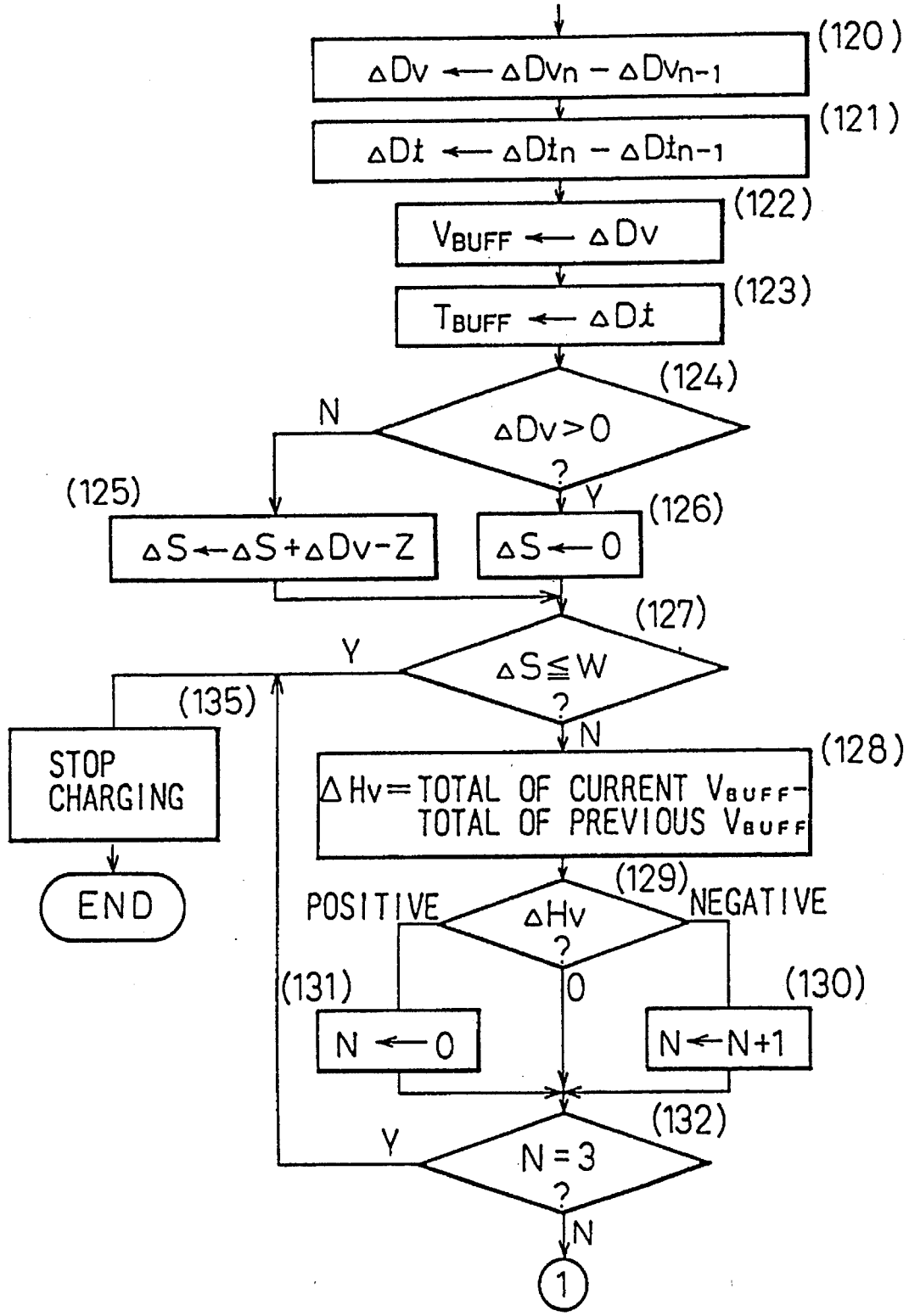
FIG. 10 is a flowchart which shows another example of the procedure in the case of executing the secondary battery charging method of the present invention.
Figure 11:
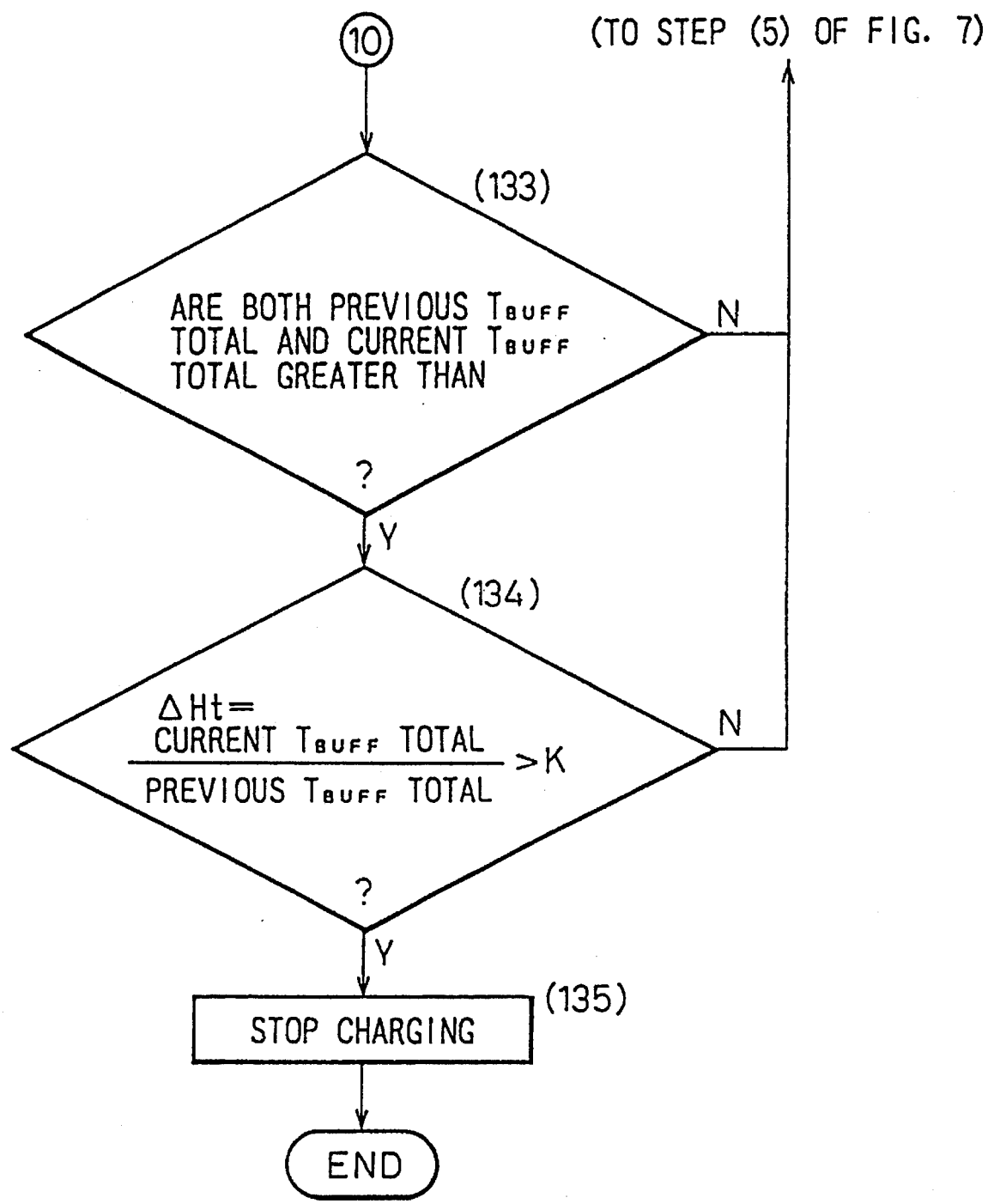
FIG. 11 is a flowchart which shows one example of the procedure in the case of executing the secondary battery charging method of the present invention.

While the flowcharts of FIG. 10 and FIG. 11 are basically the same as the flowcharts of FIG. 7 through FIG. 9 which show a high-speed charging method for secondary batteries of the present invention, there are slight differences in the method of calculation and judging performed at individual steps.

That is, in the specific example shown in FIG. 7 through FIG. 9, in performing voltage measurements, for example, said voltage data is totaled within the measurement data amount of change reading sampling time (ts), so that in the case of the charge level of said secondary battery approaching 100%, because the voltage exhibits particularly small changes in a short period of time, it is desirable to constantly track the changes to detect such a condition, and in the present invention the configuration is made such that, for each measurement data amount of change reading sampling time (ts), detection is performed of how said voltage data is varying, so that if said voltage data variation exhibits a particular condition, as shown in steps (24) through (32) in said FIGS. 8 and 9 after repeating the voltage measurement data at least 8 times at the measurement data amount of change reading sampling time (ts), the charging operation can be stopped before judging the charging condition.

FIG. 10 and FIG. 11 show the flowcharts of the operations performed in practicing the other specific example of the present invention, wherein because step (7) through step (20) are the same as in the flowchart of FIGS. 7 and 8, these steps are omitted from FIG. 10, with the flowchart beginning with the step corresponding to step (20) of FIG. 8.

Note that in the following steps 120 and 121, the same calculation as indicated in step 20 in FIG. 8, are carried out.

Essentially, in FIG. 10 and FIG. 11, based on the data Dn that is calculated and stored into the 2nd storage means before step (120), a calculation is performed to determine the difference $\Delta Dv$ (where $\Delta Dv=\Delta Dvn-\Delta Dv-1$) between the voltage data $Dvn-1$ at the immediately previous amount of change reading sampling time $ts-1$ and the voltage data $\Delta Dvn$ at the current amount of change reading sampling time $ts$, and in addition in step 121, a calculation is performed in the same manner to determine the difference $\Delta Dt$ (where $\Delta Dt=\Delta Dtn-\Delta Dtn-1$) between the temperature data $Dtn-1$ at the previous amount of change reading sampling time $ts-1$ and the temperature data $Dtn$ at the current amount of change reading sampling time $ts$.

After the above is done, at step (122), said difference $\Delta Dv$ (where $\Delta Dv=\Delta Dvn-\Delta Dv-1$), which is the amount of change in said voltage data, is stored into memory IV ($V_{BUFF}$), and at step (123), said difference ($\Delta Dt=\Delta Dtn-\Delta Dtn-1$), which is the amount of change in said temperature data is stored into memory IV ($T_{BUFF}$).

Next, in said specific example of the present invention, in particular with regard to voltage data, it is desirable to detect the width of variation occurring over a short period of time, and for that reason, at step (124), said difference $\Delta Dv$ is judged as being either a non-zero positive value or not, and if the result is YES, operation proceeds to step (126) at which $\Delta S$ is reset to zero.

Essentially, what occurs is that, if the difference in the amount of change in said voltage data between the 1st measurement data amount of change reading sampling time (ts1) and the 2nd measurement data amount of change reading sampling time (ts2) is positive, this indicates that said voltage measurement data is increasing, and in this case, the judgment is made that the charge level of the secondary battery has not reached 100%, so that constant $\Delta S$ which indicates a change in said voltage measurement means is reset to zero and operation proceeds to step (127).

On the other hand, a NO result occurs at step (124), that is, if the voltage data is either decreasing or constant, operation proceeds instead to step (125), at which the current said difference value $\Delta Dv$ is added to immediately previous value of constant $\Delta S$ and the value preestablished constant value X is subtracted from this, the result being taken as the new value of constant $\Delta S$.

In this example, since the value of $\Delta Dv$ is negative, the result is that both the difference $\Delta Dv$ and the preestablished constant Z are subtracted from the immediately previous value of constant $\Delta S$.

In addition, the above-stated constant Z is a counting constant value such that, when there is no change in the difference value $\Delta Dv$, it makes it appear as though there is change, and is set to, for example, Z=2.

Therefore, in this specific example, when the voltage data is at a peak value, and said peak value is being maintained, said constant $\Delta S$ is actually subtracted from.

Next, at step (127), a judgment is made as to whether said constant $\Delta S$ is equal to or less than a preestablished value of w, and if the result is YES, since it is possible to assume that the charge level of the secondary battery is at 100% or in the region of 100%, operation proceeds to step (135), at which the charging operation is stopped.

That is, in this specific example, said value w is set to, for example, 6, and if said constant Z is 2 and said difference value $\Delta Dv$ is zero 3 times consecutively, that is, if there is no change, the following sequence will occur.

After 1 ts: $\Delta S=\Delta S-\Delta Dv-Z=0-0-2=-2$

After 2 ts: $\Delta S=\Delta S-\Delta Dv-Z=-2-0-2=-4$

After 3 ts: $\Delta S=\Delta S-\Delta Dv-Z=-4-0-2=-6$

Thus, the charging operation will be stopped at the point at which the third repetition of the measurement data amount of change reading sampling time (ts) is made.

By way of providing an explanation with more specific data if, for example, the case in which the basic data reading time tb required for reading data is set as 0.75 second, the value L of counter II is set as 4, the charging rate C at which the secondary battery is to be charged is set to 4, and said constant A is set to 16.

In addition, in the case in which the number of repetitions M of the measurement at the measurement data amount of change reading sampling time (ts) is set to 8, and said constant w is set to $-6$, and the constant Z is set to 2, if the erroneous recharging of a nickel-cadmium battery is done after the completion of charging is hypothesized, the measurement data amount of change reading sampling time (ts) for measuring the charging voltage characteristics would be $(0.75 \times 16/3) \times 4 = 16$ seconds, and the battery voltage, $\Delta Dv$, and $\Delta S$ with respect to each measurement data amount of change reading sampling time (ts) would be as follows.

| ts  | Battery voltage | $\Delta Dv$ | $\Delta S$ |
| --- | --- | --- | --- |
| 1ts | 632 | 632 | 0 |
| 2ts | 631 | $-1$ | $-3$ |
| 3TS | 629 | $-2$ | $-7$ |

From the above results, the charging operation with respect to the secondary battery would be stopped at the measurement at the third measurement data amount of change reading sampling time (ts), the time required for this to occur being merely 48 milliseconds.

At step (128) in the flowchart of FIG. 10, from the amount of change data for voltage-of each of the data stored in said memory IV ($V_{BUFF}$) after the M repetitions of the operations of step (22) through step (23) of FIG. 8, a calculation performed to determine the difference value $\Delta Hv$ between the current amount measurement data change, that is, the total amount of change, $\Delta TDvn$, based on the M measurement data at said measurement value amount of change reading sampling time (ts1) to (tsM) and the total value of the immediately previous amount of measurement data change, that is, the overall amount of change based on the M measurement data at said measurement data amount of change reading sampling time (ts0) to (tsM−1), and at step (129) a judgment is made as to whether ΔHv is positive or negative or zero, and if it is positive, operation proceeds to step (131), at which the value N of an appropriate counter is reset to zero, after which operation proceeds to step (132)

If, however, said difference value ΔHv is zero, the value of said counter is not changed, and if said difference value ΔHv is negative, operation proceeds to step (130), at which the value N of said counter is incremented by 1, after which operation proceeds to step (132).

The effect of this is that in this specific example, a judgment is made of what condition, if any, said difference value ΔHv is maintaining continuously, and in the same manner as in the previously described specific example, in the case in which the value of said difference ΔHv is negative N times consecutively, said secondary battery is judged to have reached a charge level of 100% or the region of 100% charge level, and said charging operation is stopped.

The value N of said counter can be set appropriately as desired, and in an actual example, can be set to, for example N=3.

In the present invention, because, as shown in step (124) through step (127), if ΔDv is zero, it is assumed that the negative condition exists, even at said step (129), even if said voltage measurement data is maintaining a peak value, the condition in which the difference value ΔHv is zero will not occur, so that this will be counted as a negative value.

Then, operation proceeds to step (132), at which a judgment is made as to whether the value of N of said counter is 3, and if the result was YES, the charging operation with respect to said secondary battery is stopped, but if the results was NO, operation proceeds step (133), at which, after said difference value ΔDt (ΔDt=Dtn−Dt(n−1)), which is the temperature data amount of change stored into memory IV ($T_{BUFF}$) at step (123) is used and M repetitions are made, a determination is made of the current amount of measurement data change, that is, the overall amount of change, the total value ΔTDtn, based on the M measurement data at the measurement data amount of change reading sampling time (ts1) to (tsM), and a determination is made of the immediately previous total amount of change, which is the overall amount of change ΔTDt(n−1), which is based on the M measurement data at said measurement value amount of change reading sampling time (ts0) to (tsM−1), and a judgment is made as to whether or not both these values are a preestablished value α.

In these operations, in performing the charging of said secondary battery, because if some sort of error or misoperation causes a sudden rise in temperature in spite of the fact that the charge level has not even reached the 100% region, an erroneous stoppage of said charging operation would occur, to avoid this condition, since the temperature rise of said secondary battery during charging is known beforehand, data related to the normal amount of temperature change occurring when the charge level reaches the 100% region is set as the required data, for example by setting an appropriate value of α is set into an appropriate memory, in which case a return would be made to step (7) of FIG. 7, whereupon the above-described steps would be repeated.

In said step (133), in the case in which both the above-noted amounts of total temperature change are equal to or greater than the preestablished value α, operation proceeds to step (134), at which a judgment is made as to whether the rate of change ΔHt between the current amount of measurement data change, that is, the overall amount of change ΔTDn, which is based on the M measurement data at said measurement data amount of change reading sampling time (ts1) to (tsM), and the immediately previous amount of measurement data change, that is, the overall amount of change ΔTDtn−1, which is based on the M measurement data at said measurement data amount of change reading sampling time (ts0) to (tsM−1), is or is not greater than a preestablished value, for example K, and if the result of this judgment is YES, the charging operation is stopped.

If, however, the result was NO, return is made to step (5) of FIG. 7, whereupon the above-described steps would be repeated.

What follows is an explanation of the results of using the secondary battery charging method of the present invention to charge secondary batteries of differing constituent elements and under different charging conditions, with reference made to Table I through Table V and FIG. 12 through FIG. 20.

Table I shows the case of using the secondary battery charging method of the present invention suitable for nickel-cadmium batteries having a charging rate of 0.25 C, and wherein the settings:

the basic data reading time required to read data, tb=0.75 second;

counter II value L=4;

charging rate C=0.25;

Setting constant A=16; and

Number of repetitions of the measurement operation to be performed at each measurement data amount of change reading sampling time (ts) M=8 were made for the execution of the charging operation.

In this specific example, the amount of change reading sampling time, ts, would be ts=(0.75×16/0.25)×4=192 seconds.

Table I shows the voltage measurement data at each measurement data amount of change reading sampling time (ts), the total amount of voltage change ΔTDv at step (122) of FIG. 10, and the counter value N at step (130) and step (131) of FIG. 10.

Essentially in Table I the battery voltage data is the raw data obtained at each said measurement data amount of change reading sampling time (ts), and the overall total amount of change ΔTDv indicates the difference value between the total of the shift values summed over 8 times at each of the measurement data amount of change reading sampling times (ts1) to (ts8) and total of the shift values summed over 8 times at each of the measurement data amount of change reading sampling times (ts2) to (ts9).

The count value N, in accordance with above-stated step (129) through step (131) in FIG. 10, is added to or subtracted from, depending upon whether said difference value ΔHv is positive, negative, or zero.

That is, during the period from ts1 to ts8, since there is no previous data, the output of said difference ΔHv is zero, so that the count value N remains zero, but at ts9, said total amount of change ΔTDv becomes 32, so that the ΔHv value of −521 is negative, resulting in said count value N being incremented by 1.

Next, at ts10, in the same manner, since said total amount of change ΔTDv becomes 24, said difference amount ΔHv takes the negative value of −8, so that said count value N is incremented by 1, making said count value 2.

In the same manner, because up to ts15 said difference value ΔHv is continuously negative, sound count value N is incremented by 1 each time, so that the count value is 7 at ts15.

However, in this specific example, in general, said count value is set to 3, so that the charging operation is stopped when said count value exceeds 3, so that although in this specific example the charging operation is stopped at ts11, since the battery voltage of said secondary battery which has reached 100% charge level is known beforehand, it is possible to perform processing so that, as long as that voltage is not exceeded, the data value of said counter is not valid.

For this reason, in this specific example, if the battery voltage of said secondary battery is set to, for example, to 580 V, and if the above-stated count value N is made invalid when the battery voltage exceeds said 580 V, there will be no problem of the charging operation stopping at ts11.

Furthermore, at ts16, since the difference value ΔHv becomes −1, the counter value is reset from 7 to 0.

The same type of operation is repeated, and at ts80 because the battery voltage is 600 V and said counter value is 3, said charging operation is stopped.

Figure 12:
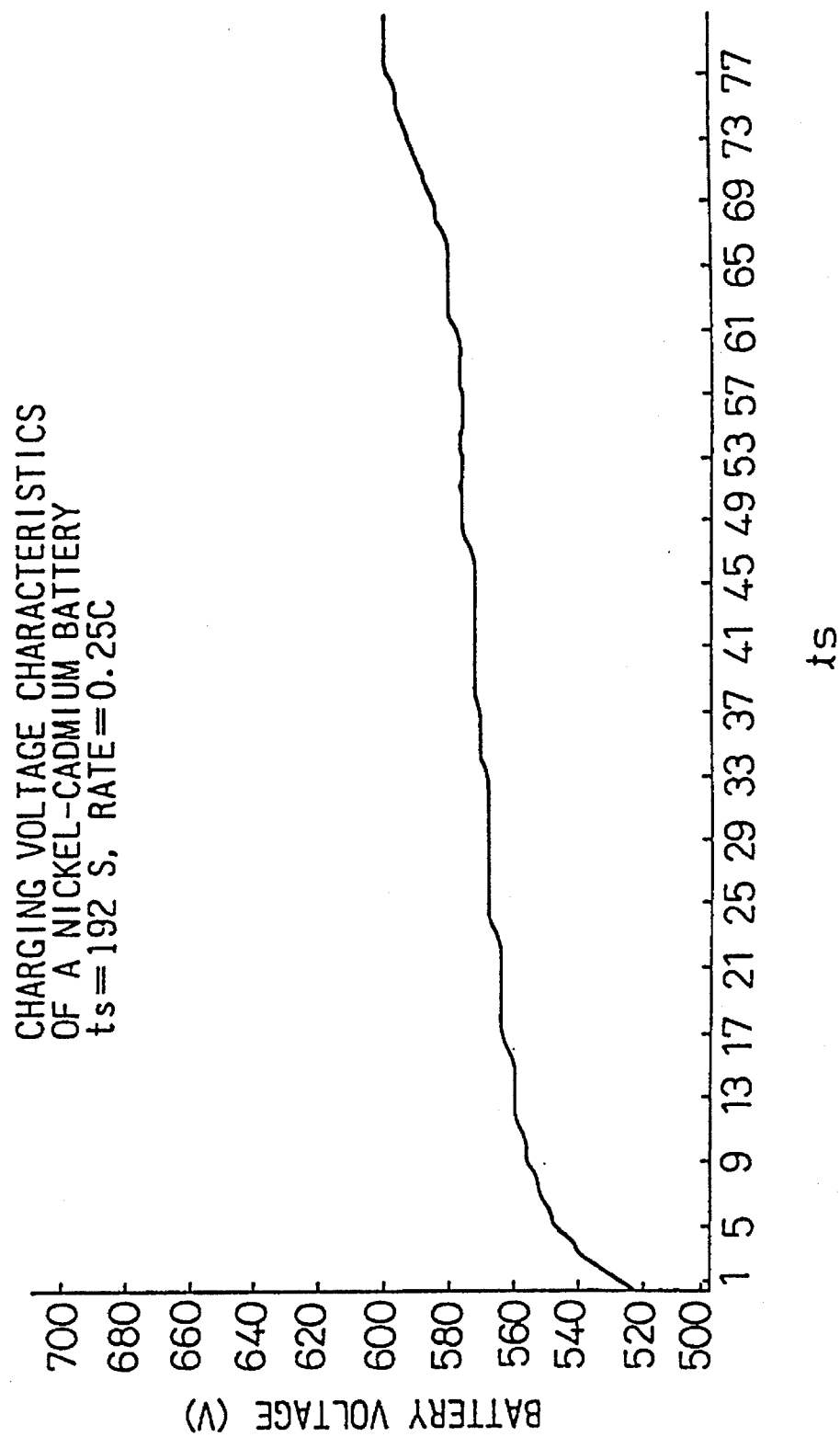
FIG. 12 is a graph showing one example of the voltage characteristics of a nickel-cadmium battery when charged at 0.25 C.
Figure 13:
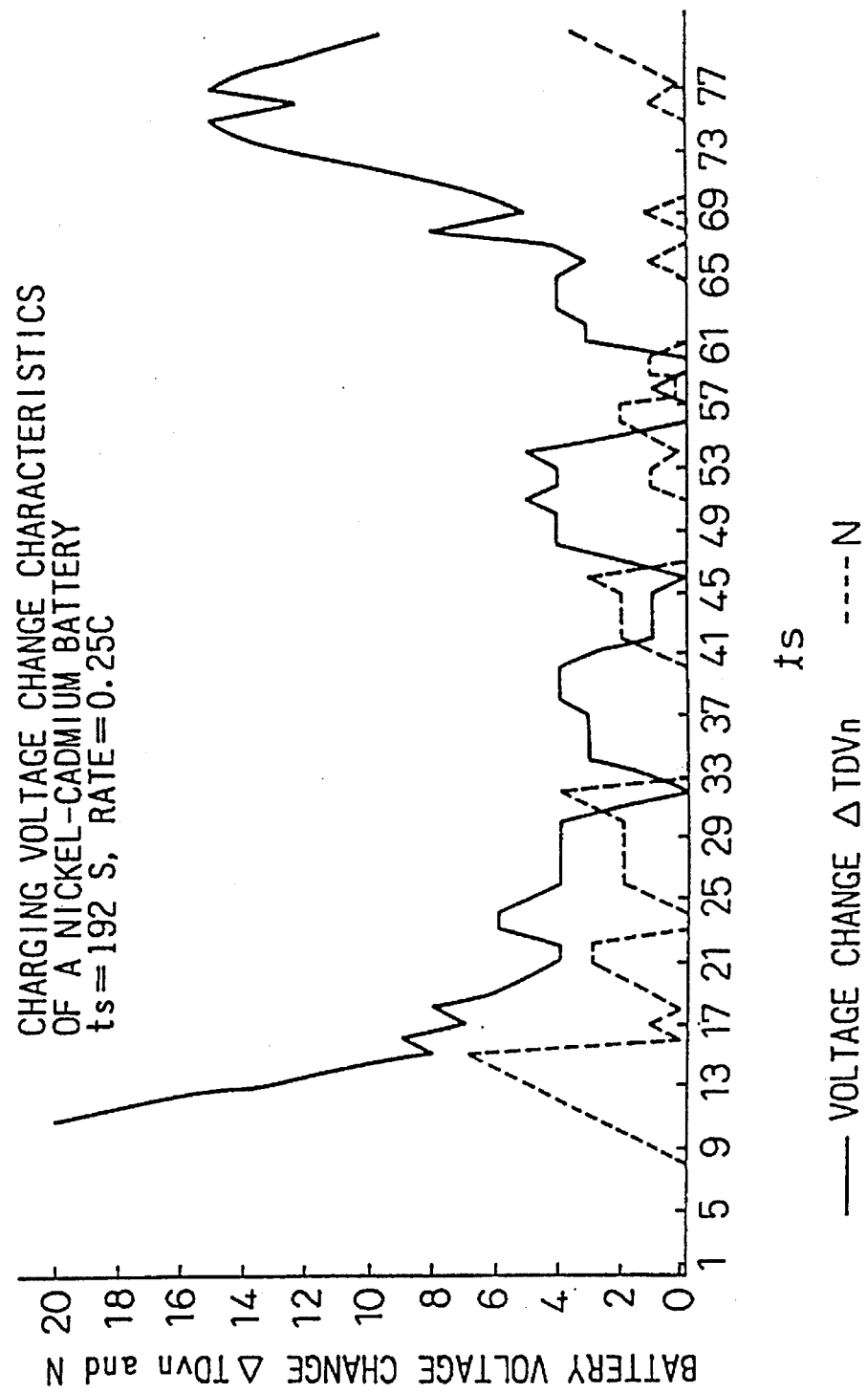
FIG. 13 is a graph showing the a graph of the changes in the overall voltage amount of change ΔTDvn and the counter value N when the charging of FIG. 12 is done.

FIG. 12 shows a graph of the measurement data of Table I, with ts plotted along the horizontal axis, and in FIG. 13, plotted from the raw data of FIG. 12, the solid line shows the plot of said total amount of change ΔTDv for each ts, and the dotted line shows said counter value N plotted for each ts.

Table II shows the case of using the secondary battery charging method of the present invention suitable for nickel-cadmium batteries having a charging rate of 3 C, and wherein the settings:

the basic data reading time required to read data, tb=0.75 second;

counter II value L=4;

charging rate C=3;

Setting constant A=16;

Number of repetitions of the measurement operation to be performed at each measurement data amount of change reading sampling time (ts) M=8; and constant K=2 were made for the execution of the charging operation.

In this specific example, the amount of change reading sampling time, ts, would be ts=(0.75×16/3)×4=16 seconds.

Table II shows the battery temperature measurement data at each measurement data amount of change reading sampling time (ts), the total amount of temperature change ΔTDt at step (123) of FIG. 10, and the change ratio ΔHt of the amount of temperature change at step (134) of FIG. 10.

Essentially in Table II the temperature data is the raw data obtained at each said measurement data amount of change reading sampling time (ts), the overall total amount of temperature change ΔTDt indicates the difference value between the total of the shift values summed over 8 times at each of the measurement data amount of change reading sampling times (ts1) to (ts8) and total of the shift values summed over 8 times at each of the measurement data amount of change reading sampling times (ts2) to (ts9), and ΔHt indicates the rate of change between adjacent values of ΔTDt, that is $\Delta Ht = \Delta TDtn/\Delta TDtn-1$.

In accordance with the operation of above-stated step (34) of FIG. 10, the change ratio of temperature change ΔHt is compared with above-described preestablished constant value K=2, and if ΔHt is equal to or greater than 2 (i.e., ΔHt≧K), because it can be predicted that the charge level has reached 100% or the 100% region, said charging operation is stopped.

In the data of Table II, if the denominator of the expression for $\Delta Ht = \Delta TDtn/\Delta TDtn-1$ is zero, an error is indicated.

In this specific example, at ts57, the data for said rate of change of temperature change $\Delta Ht = \Delta TDtn/\Delta TDtn-1$ exceeds the constant K=2, so that at this point said charging operation is stopped.

Figure 14:
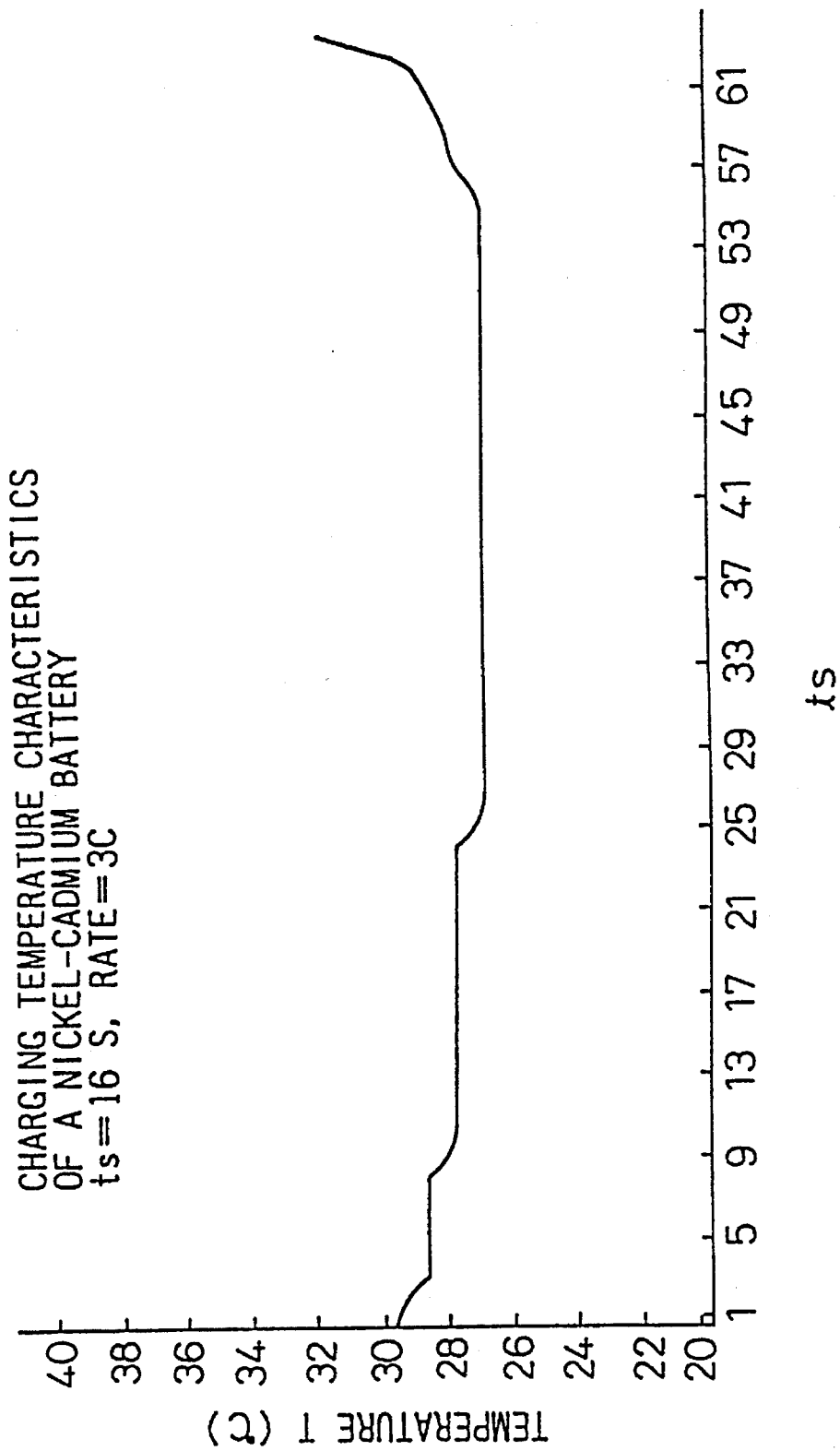
FIG. 14 is a graph showing one example of the temperature characteristics of a nickel-cadmium battery when charged at 3 C.

FIG. 14 is a graph of with regard to battery temperature measurement data shown in Table II, with ts plotted along the horizontal axis.

Table III shows the case of using the secondary battery charging method of the present invention suitable for nickel-cadmium batteries having a charging rate of 3 C, and wherein the settings:

the basic data reading time required to read data, tb=0.75 second;

counter II value L=4;

charging rate C=3;

Setting constant A=16; and the number of repetitions of the measurement operation to be performed at each measurement data amount of change reading sampling time (ts) M=8 were made for the execution of the charging operation.

In this specific example, the amount of change reading sampling time, ts, would be ts=(0.75×16/3)×4=16 seconds.

Table III shows the battery voltage data at each measurement data amount of change reading sampling time (ts), the total amount of voltage change ΔTDv at step (122) of FIG. 10, and the counter value N at step (130) and step (131) of FIG. 10.

Essentially, the battery voltage data and other data of Table III, are the same type of data as in above Table I, and therefore no particular separate explanation will be provided, although it can be said that this indicates that the same type of operations as in the case of Table I enable charging in a short period of time with a large current, and in particular that, at 3 C, at the point of ts61, because charging is completed, the charge is seen to have been completed at a time-approximately 16 minutes from the start of charging operation.

Figure 15:
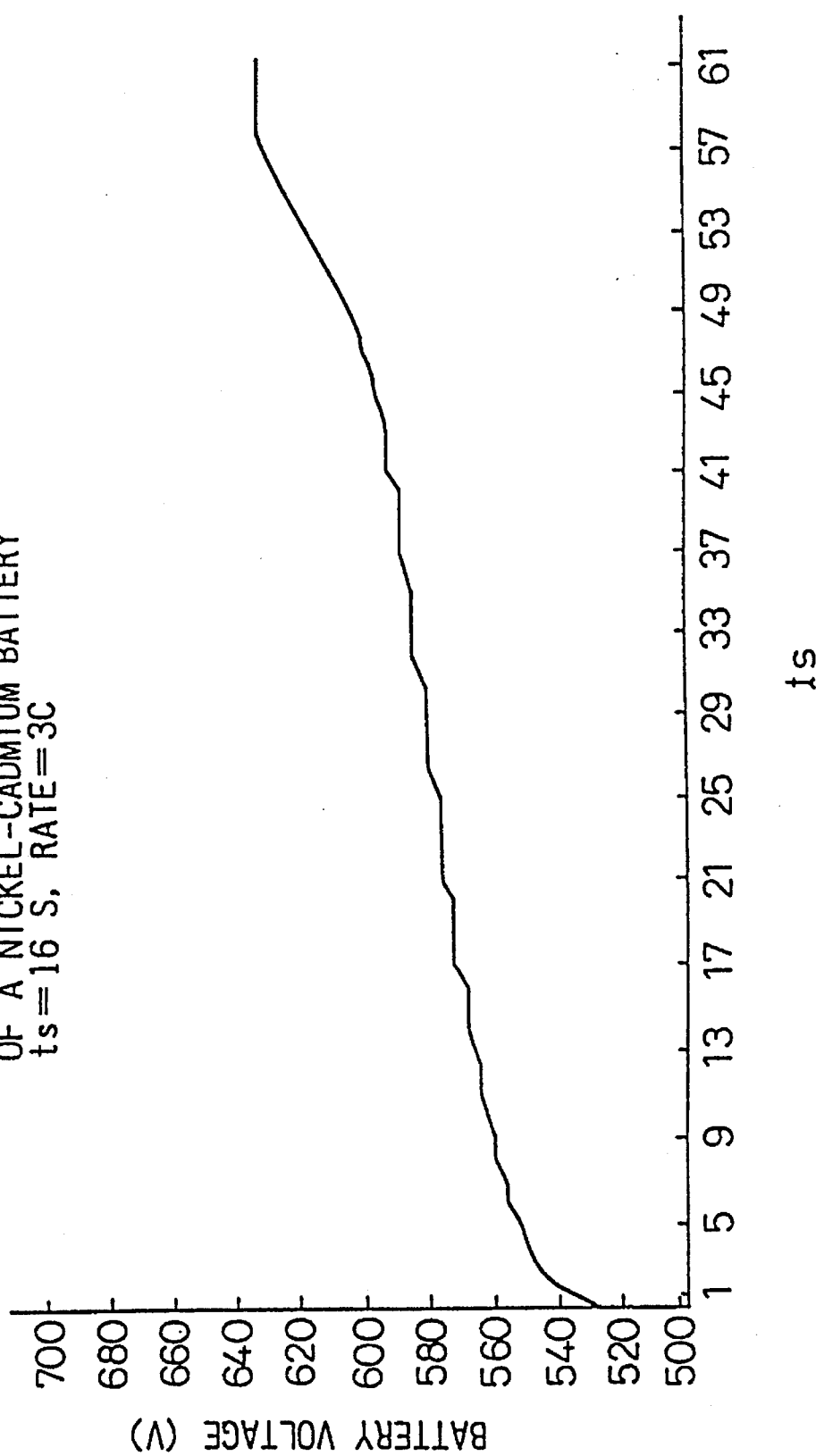
FIG. 15 is a graph showing one example of the voltage characteristics of a nickel-cadmium battery when charged at 3 C.

FIG. 15 and FIG. 16 are graphs that correspond to above-discussed FIG. 12 and FIG. 13.

Table IV shows the case of using the secondary battery charging method of the present invention suitable for nickel-hydrogen batteries having a charging rate of 0.25 C, and wherein the settings:

the basic data reading time required to read data, tb=0.75 second;

counter II value L=4;

charging rate C=0.25;

Setting constant A=16; and the number of repetitions of the measurement operation to be performed at each measurement data amount of change reading sampling time (ts) M=8 were made for the execution of the charging operation.

In this specific example, the amount of change reading sampling time, ts, would be ts=(0.75×16/0.25)×4=192 seconds.

Table IV shows the battery voltage data at each measurement data amount of change reading sampling time (ts), the total amount of voltage change ΔTDv at step (122) of FIG. 10, and the counter value N at step (130) and step (131) of FIG. 10.

Essentially, the battery voltage data and other data of Table IV, are the same type of data as in above Table I, and therefore no particular separate explanation will be provided, although it can be said that this indicates that the same type of operations as in the case of Table I enable complete charging of a new type of secondary battery, the nickel-hydrogen battery, at ts79, which is in a period of time of 252 minutes.

FIG. 17 and FIG. 18 are the graphs that correspond to above-discussed FIG. 12 and FIG. 13.

Table V shows the case of using the secondary battery charging method of the present invention suitable for nickel-hydrogen batteries having a charging rate of 1 C, and wherein the settings:

the basic data reading time required to read data, tb=0.75 second;

counter II value L=4;

charging rate C=1;

Setting constant A=16; and the number of repetitions of the measurement operation to be performed at each measurement data amount of change reading sampling time (ts) M=8 were made for the execution of the charging operation.

In this specific example, the amount of change reading sampling time, ts, would be ts=(0.75×16/1)×4=48 seconds.

Table V shows the battery voltage data at each measurement data amount of change reading sampling time (ts), the total amount of voltage change ΔTDv at step (122) of FIG. 10, and the counter value N at step (130) and step (131) of FIG. 10.

Essentially, the battery voltage data and other data of Table V, are the same type of data as in above Table I, and therefore no particular separate explanation will be provided, although it can be said that this indicates that the same type of operations as in the case of Table I enable complete charging of a new type of secondary battery, the nickel-hydrogen battery, at ts78, which is in a period of time of 62 minutes, 24 seconds.

FIG. 19 and FIG. 20 are the graphs that correspond to above-discussed FIG. 12 and FIG. 13.

Because the high-speed charging method for secondary batteries of the present invention makes use of the above-described technical configuration, even for secondary batteries of differing types, in consideration of the mutually differing charging characteristics exhibited by the secondary batteries, such as terminal voltage or temperature, it is possible to determine the common characteristics of secondary batteries having differing constituent elements, to accurate determine point at which the charge level reaches nearly 100%, enabling not only one and the same apparatus to be used to reliably charge secondary batteries of differing construction, but also enabling the accurate determination of the charge level during the charging process, the quick determination of the point at which the charge level reaches a level of nearly 100%, and the stopping of the charging process at that point, the result being not only a reliable avoidance of the problem encountered when the charging is continued even after the charge level has exceeded 100%, thereby causing the temperature of the secondary battery to rise above its rated maximum temperature, leading to damage to said secondary battery, but also a determination of the characteristics of said secondary battery with respect to the speed of charge, or charge rate, thereby enabling charging of secondary batteries which are of the same constituent elements at different charge rates, further enabling in particular the precise high-speed charging of secondary batteries.

That is, in the present invention, in addition to being able to charge secondary batteries having individually differing constructions, there being secondary batteries of the same type but having differing charging rates, it is possible to also, in accordance with the charging rate that is indicated as a specification, by executing sampling of the ideal measurement values, to collect precise data, enabling accurate and high-speed charging.

TABLE I

| tS | Battery Voltage (V) | ΔTDvn | N |
|----|---------------------|-------|---|
| 1  | 524 | 524 | 0 |
| 2  | 532 | 532 | 0 |
| 3  | 539 | 539 | 0 |
| 4  | 542 | 542 | 0 |
| 5  | 547 | 547 | 0 |
| 6  | 549 | 549 | 0 |
| 7  | 552 | 552 | 0 |
| 8  | 553 | 553 | 0 |
| 9  | 556 | 32  | 1 |
| 10 | 556 | 24  | 2 |
| 11 | 558 | 19  | 3 |
| 12 | 559 | 17  | 4 |
| 13 | 560 | 13  | 5 |
| 14 | 560 | 11  | 6 |
| 15 | 560 | 8   | 7 |
| 16 | 562 | 9   | 0 |
| 17 | 563 | 7   | 1 |
| 18 | 564 | 8   | 0 |
| 19 | 564 | 6   | 1 |
| 20 | 564 | 5   | 2 |
| 21 | 564 | 4   | 3 |
| 22 | 564 | 4   | 3 |
| 23 | 566 | 6   | 0 |
| 24 | 568 | 6   | 0 |
| 25 | 568 | 5   | 1 |
| 26 | 568 | 4   | 2 |
| 27 | 568 | 4   | 2 |
| 28 | 568 | 4   | 2 |
| 29 | 568 | 4   | 2 |
| 30 | 568 | 4   | 2 |
| 31 | 568 | 2   | 3 |
| 32 | 568 | 0   | 4 |
| 33 | 569 | 1   | 0 |
| 34 | 571 | 3   | 0 |
| 35 | 571 | 3   | 0 |
| 36 | 571 | 3   | 0 |
| 37 | 571 | 3   | 0 |
| 38 | 572 | 4   | 0 |
| 39 | 572 | 4   | 0 |
| 40 | 572 | 4   | 0 |
| 41 | 572 | 3   | 1 |
| 42 | 572 | 1   | 2 |
| 43 | 572 | 1   | 2 |
| 44 | 572 | 1   | 2 |
| 45 | 572 | 1   | 2 |
| 46 | 572 | 0   | 3 |
| 47 | 574 | 2   | 0 |
| 48 | 576 | 4   | 0 |
| 49 | 576 | 4   | 0 |
| 50 | 576 | 4   | 0 |
| 51 | 577 | 5   | 0 |
| 52 | 576 | 4   | 1 |
| 53 | 576 | 4   | 1 |
| 54 | 577 | 5   | 0 |
| 55 | 576 | 2   | 1 |
| 56 | 576 | 0   | 2 |
| 57 | 576 | 0   | 2 |
| 58 | 577 | 1   | 0 |
| 59 | 577 | 0   | 1 |
| 60 | 576 | 0   | 1 |
| 61 | 579 | 3   | 0 |
| 62 | 580 | 3   | 0 |
| 63 | 580 | 4   | 0 |
| 64 | 580 | 4   | 0 |
| 65 | 580 | 4   | 0 |
| 66 | 580 | 3   | 1 |
| 67 | 581 | 4   | 0 |
| 68 | 584 | 8   | 0 |
| 69 | 584 | 5   | 1 |
| 70 | 586 | 6   | 0 |
| 71 | 588 | 8   | 0 |

TABLE I-continued

| tS | Battery Voltage (V) | ΔTDvn | N |
|---|---|---|---|
| 72 | 590 | 10 | 0 |
| 73 | 592 | 12 | 0 |
| 74 | 594 | 14 | 0 |
| 75 | 596 | 15 | 0 |
| 76 | 596 | 12 | 1 |
| 77 | 599 | 15 | 0 |
| 78 | 600 | 14 | 1 |
| 79 | 600 | 12 | 2 |
| 80 | 600 | 10 | 3 |

TABLE II

| tS | Battery Temperature (°C.) | ΔTDtn | ΔTDtn/ΔTDtn-1 (K = 2) |
|---|---|---|---|
| 1 | 9.54 | 29.54 | Error |
| 2 | 9.32 | 29.32 | 0.99 |
| 3 | 8.65 | 28.65 | 0.98 |
| 4 | 8.65 | 28.65 | 1.00 |
| 5 | 8.65 | 28.65 | 1.00 |
| 6 | 8.65 | 28.65 | 1.00 |
| 7 | 8.65 | 28.65 | 1.00 |
| 8 | 8.65 | 28.65 | 1.00 |
| 9 | 7.99 | −1.55 | −0.05 |
| 10 | 7.76 | −1.55 | 1.00 |
| 11 | 7.76 | −0.89 | 0.57 |
| 12 | 7.76 | −0.89 | 1.00 |
| 13 | 7.76 | −0.89 | 1.00 |
| 14 | 7.76 | −0.89 | 1.00 |
| 15 | 7.76 | −0.89 | 1.00 |
| 16 | 7.76 | −0.89 | 1.00 |
| 17 | 7.76 | −0.22 | 0.25 |
| 18 | 7.76 | 0.00 | 0.00 |
| 19 | 7.76 | 0.00 | Error |
| 20 | 7.76 | 0.00 | Error |
| 21 | 7.76 | 0.00 | Error |
| 22 | 7.76 | 0.00 | Error |
| 23 | 7.76 | 0.00 | Error |
| 24 | 7.76 | 0.00 | Error |
| 25 | 7.10 | −0.67 | Error |
| 26 | 6.88 | −0.89 | 1.33 |
| 27 | 6.88 | −0.89 | 1.00 |
| 28 | 6.88 | −0.89 | 1.00 |
| 29 | 6.88 | −0.89 | 1.00 |
| 30 | 6.88 | −0.89 | 1.00 |
| 31 | 6.88 | −0.89 | 1.00 |
| 32 | 6.88 | −0.89 | 1.00 |
| 33 | 6.88 | −0.22 | 0.25 |
| 34 | 6.88 | 0.00 | 0.00 |
| 35 | 6.88 | 0.00 | Error |
| 36 | 6.88 | 0.00 | Error |
| 37 | 6.88 | 0.00 | Error |
| 38 | 6.88 | 0.00 | Error |
| 39 | 6.88 | 0.00 | Error |
| 40 | 6.88 | 0.00 | Error |
| 41 | 6.88 | 0.00 | Error |
| 42 | 6.88 | 0.00 | Error |
| 43 | 6.88 | 0.00 | Error |
| 44 | 6.88 | 0.00 | Error |
| 45 | 6.88 | 0.00 | Error |
| 46 | 6.88 | 0.00 | Error |
| 47 | 6.88 | 0.00 | Error |
| 48 | 6.88 | 0.00 | Error |
| 49 | 6.88 | 0.00 | Error |
| 50 | 6.88 | 0.00 | Error |
| 51 | 6.88 | 0.00 | Error |
| 52 | 6.88 | 0.00 | Error |
| 53 | 6.88 | 0.00 | Error |
| 54 | 6.88 | 0.00 | Error |
| 55 | 6.88 | 0.00 | Error |
| 56 | 7.10 | 0.22 | Error |
| 57 | 7.54 | 0.67 | 3.00≧K |
| 58 | 7.76 | 0.89 | 1.33 |

TABLE II-continued

| tS | Battery Temperature (°C.) | ΔTDtn | ΔTDtn/ΔTDtn-1 (K = 2) |
|---|---|---|---|
| 59 | 7.99 | 1.11 | 1.25 |
| 60 | 8.21 | 1.33 | 1.20 |
| 61 | 8.43 | 1.55 | 1.17 |
| 62 | 8.87 | 2.00 | 1.29 |
| 63 | 1.09 | 4.22 | 2.11 |

TABLE III

| tS | Battery Voltage (V) | ΔTDvn | N |
|---|---|---|---|
| 1 | 529 | 529 | 0 |
| 2 | 542 | 542 | 0 |
| 3 | 547 | 547 | 0 |
| 4 | 550 | 550 | 0 |
| 5 | 552 | 552 | 0 |
| 6 | 556 | 556 | 0 |
| 7 | 556 | 556 | 0 |
| 8 | 560 | 560 | 0 |
| 9 | 560 | 31 | 1 |
| 10 | 562 | 20 | 2 |
| 11 | 564 | 17 | 3 |
| 12 | 564 | 14 | 4 |
| 13 | 566 | 14 | 4 |
| 14 | 568 | 12 | 5 |
| 15 | 568 | 12 | 5 |
| 16 | 568 | 8 | 6 |
| 17 | 572 | 12 | 0 |
| 18 | 572 | 10 | 1 |
| 19 | 572 | 8 | 2 |
| 20 | 572 | 8 | 2 |
| 21 | 575 | 9 | 0 |
| 22 | 576 | 8 | 1 |
| 23 | 576 | 8 | 1 |
| 24 | 576 | 8 | 1 |
| 25 | 576 | 4 | 2 |
| 26 | 579 | 7 | 0 |
| 27 | 580 | 8 | 0 |
| 28 | 580 | 8 | 0 |
| 29 | 580 | 5 | 1 |
| 30 | 580 | 4 | 2 |
| 31 | 582 | 6 | 0 |
| 32 | 584 | 8 | 0 |
| 33 | 584 | 8 | 0 |
| 34 | 584 | 5 | 1 |
| 35 | 584 | 4 | 2 |
| 36 | 586 | 6 | 0 |
| 37 | 588 | 8 | 0 |
| 38 | 588 | 8 | 0 |
| 39 | 588 | 6 | 1 |
| 40 | 588 | 4 | 2 |
| 41 | 592 | 8 | 0 |
| 42 | 592 | 8 | 0 |
| 43 | 592 | 8 | 0 |
| 44 | 594 | 8 | 0 |
| 45 | 596 | 8 | 0 |
| 46 | 597 | 9 | 0 |
| 47 | 600 | 12 | 0 |
| 48 | 601 | 13 | 0 |
| 49 | 604 | 12 | 1 |
| 50 | 606 | 14 | 0 |
| 51 | 609 | 17 | 0 |
| 52 | 612 | 18 | 0 |
| 53 | 616 | 20 | 0 |
| 54 | 620 | 23 | 0 |
| 55 | 624 | 24 | 0 |
| 56 | 627 | 26 | 0 |
| 57 | 630 | 26 | 0 |
| 58 | 632 | 26 | 0 |
| 59 | 632 | 23 | 1 |
| 60 | 632 | 20 | 2 |
| 61 | 632 | 16 | 3 |

TABLE IV

| tS | Battery Voltage (V) | ΔTDvn | N |
|---|---|---|---|
| 1 | 513 | 513 | 0 |
| 2 | 525 | 525 | 0 |
| 3 | 534 | 534 | 0 |
| 4 | 541 | 541 | 0 |
| 5 | 545 | 545 | 0 |
| 6 | 549 | 549 | 0 |
| 7 | 552 | 552 | 0 |
| 8 | 554 | 554 | 0 |
| 9 | 556 | 43 | 1 |
| 10 | 556 | 31 | 2 |
| 11 | 558 | 24 | 3 |
| 12 | 560 | 19 | 4 |
| 13 | 560 | 15 | 5 |
| 14 | 560 | 11 | 6 |
| 15 | 560 | 8 | 7 |
| 16 | 564 | 10 | 0 |
| 17 | 564 | 8 | 1 |
| 18 | 564 | 8 | 1 |
| 19 | 564 | 6 | 2 |
| 20 | 564 | 4 | 3 |
| 21 | 564 | 4 | 3 |
| 22 | 565 | 5 | 0 |
| 23 | 568 | 8 | 0 |
| 24 | 568 | 4 | 1 |
| 25 | 568 | 4 | 1 |
| 26 | 568 | 4 | 1 |
| 27 | 568 | 4 | 1 |
| 28 | 568 | 4 | 1 |
| 29 | 568 | 4 | 1 |
| 30 | 568 | 3 | 2 |
| 31 | 568 | 0 | 3 |
| 32 | 568 | 0 | 3 |
| 33 | 568 | 0 | 3 |
| 34 | 568 | 0 | 3 |
| 35 | 569 | 1 | 0 |
| 36 | 570 | 2 | 0 |
| 37 | 570 | 2 | 0 |
| 38 | 570 | 2 | 1 |
| 39 | 571 | 3 | 0 |
| 40 | 571 | 3 | 0 |
| 41 | 571 | 3 | 0 |
| 42 | 571 | 3 | 0 |
| 43 | 572 | 3 | 1 |
| 44 | 572 | 2 | 2 |
| 45 | 572 | 2 | 3 |
| 46 | 572 | 2 | 0 |
| 47 | 572 | 1 | 1 |
| 48 | 572 | 1 | 1 |
| 49 | 572 | 1 | 1 |
| 50 | 572 | 1 | 1 |
| 51 | 574 | 2 | 0 |
| 52 | 576 | 4 | 1 |
| 53 | 576 | 4 | 1 |
| 54 | 576 | 4 | 1 |
| 55 | 576 | 4 | 1 |
| 56 | 576 | 4 | 1 |
| 57 | 576 | 4 | 1 |
| 58 | 576 | 4 | 1 |
| 59 | 576 | 2 | 2 |
| 60 | 578 | 2 | 2 |
| 61 | 580 | 4 | 0 |
| 62 | 580 | 4 | 0 |
| 63 | 580 | 4 | 0 |
| 64 | 580 | 4 | 0 |
| 65 | 580 | 4 | 0 |
| 66 | 583 | 7 | 0 |
| 67 | 584 | 8 | 0 |
| 68 | 584 | 6 | 1 |
| 69 | 587 | 7 | 2 |
| 70 | 588 | 8 | 0 |
| 71 | 591 | 11 | 0 |
| 72 | 592 | 12 | 0 |
| 73 | 595 | 15 | 0 |
| 74 | 596 | 13 | 1 |
| 75 | 597 | 13 | 1 |
| 76 | 600 | 16 | 0 |
| 77 | 600 | 13 | 1 |
| 78 | 600 | 12 | 2 |
| 79 | 600 | 9 | 3 |

TABLE V

| tS | Battery Voltage (V) | ΔTDvn | N |
|---|---|---|---|
| 1 | 543 | 543 | 0 |
| 2 | 560 | 560 | 0 |
| 3 | 564 | 564 | 0 |
| 4 | 565 | 565 | 0 |
| 5 | 568 | 568 | 0 |
| 6 | 568 | 568 | 0 |
| 7 | 568 | 568 | 0 |
| 8 | 568 | 568 | 0 |
| 9 | 568 | 25 | 1 |
| 10 | 572 | 12 | 2 |
| 11 | 572 | 8 | 3 |
| 12 | 572 | 7 | 4 |
| 13 | 572 | 4 | 5 |
| 14 | 572 | 4 | 5 |
| 15 | 572 | 4 | 5 |
| 16 | 572 | 4 | 5 |
| 17 | 572 | 4 | 5 |
| 18 | 573 | 1 | 6 |
| 19 | 575 | 3 | 0 |
| 20 | 576 | 4 | 0 |
| 21 | 576 | 4 | 0 |
| 22 | 576 | 4 | 0 |
| 23 | 576 | 4 | 0 |
| 24 | 576 | 4 | 0 |
| 25 | 576 | 4 | 0 |
| 26 | 576 | 3 | 1 |
| 27 | 576 | 1 | 2 |
| 28 | 576 | 0 | 3 |
| 29 | 576 | 0 | 3 |
| 30 | 576 | 0 | 3 |
| 31 | 576 | 0 | 3 |
| 32 | 576 | 0 | 3 |
| 33 | 576 | 0 | 3 |
| 34 | 576 | 0 | 3 |
| 35 | 578 | 2 | 0 |
| 36 | 579 | 3 | 0 |
| 37 | 580 | 4 | 0 |
| 38 | 580 | 4 | 0 |
| 39 | 580 | 4 | 0 |
| 40 | 580 | 4 | 0 |
| 41 | 580 | 4 | 0 |
| 42 | 580 | 4 | 0 |
| 43 | 580 | 2 | 1 |
| 44 | 580 | 1 | 2 |
| 45 | 580 | 0 | 3 |
| 46 | 580 | 0 | 3 |
| 47 | 580 | 0 | 3 |
| 48 | 580 | 0 | 3 |
| 49 | 583 | 3 | 0 |
| 50 | 584 | 4 | 0 |
| 51 | 584 | 4 | 0 |
| 52 | 584 | 4 | 0 |
| 53 | 584 | 4 | 0 |
| 54 | 584 | 4 | 0 |
| 55 | 584 | 4 | 0 |
| 56 | 584 | 4 | 0 |
| 57 | 586 | 3 | 1 |
| 58 | 588 | 4 | 0 |
| 59 | 588 | 4 | 0 |
| 60 | 588 | 4 | 0 |
| 61 | 588 | 4 | 0 |
| 62 | 589 | 5 | 0 |
| 63 | 592 | 8 | 0 |
| 64 | 592 | 8 | 0 |
| 65 | 592 | 6 | 1 |
| 66 | 595 | 7 | 0 |

TABLE V-continued

| tS | Battery Voltage (V) | ΔTDvn | N |
|---|---|---|---|
| 67 | 596 | 8 | 0 |
| 68 | 598 | 10 | 0 |
| 69 | 600 | 12 | 0 |
| 70 | 602 | 13 | 0 |
| 71 | 604 | 12 | 1 |
| 72 | 606 | 14 | 0 |
| 73 | 608 | 16 | 0 |
| 74 | 609 | 14 | 1 |
| 75 | 612 | 16 | 0 |
| 76 | 612 | 14 | 1 |
| 77 | 612 | 12 | 2 |
| 78 | 612 | 10 | 3 |

What is claimed is:

1. A method of charging a secondary battery, comprising:

a step 1 which sets the basic data reading time tb required to read data;

a step 2 which sets the charging rate C;

a step 3 which sets the adjusted data reading time tc, according to the set charging rate C and said basic data reading time tb, said corrected data reading time tc being unique to said charging rate C;

a step 4 which, during the charging operation, uses an appropriate sampling means to measure the terminal voltage of said secondary battery at least one time during each said adjusted data reading time tc, and which stores the measured voltage data at that time into an appropriate 1st memory means;

a step 5 which repeats the operation of said step 4 a predetermined number of times L, takes the summation of the plurality of voltage data obtained in each adjusted data reading time tc, and stores the resulting amount of adjusted voltage value Dvn over the amount of voltage data change reading sampling time ts (where ts=L×tc) into an appropriate 2nd memory means;

a step 6 which calculates the difference between the amount of adjusted voltage value Dv1 for the 1st sampling time (ts1) and the amount of adjusted voltage value Dv2 for the next, 2nd, sampling time (ts2) obtained in step 5, and which stores the resulting difference in amount of change ΔDv in a 3rd memory means;

a step 7 which continuously repeats said step 6 a predetermined number of times M, and which takes the summation of each of the difference values of ΔDv1 to ΔDvM (M values) obtained at each amount of change reading sampling time (ts), and determines the amount of voltage data change ΔTDv for the overall said amount of change reading sampling time t (where t=ts×M), the results being stored in a 4th memory means;

a step 8 which performs a calculation, based on the amount of voltage data change ΔTDv stored in said 4th memory means, to determine the difference ΔHv between the voltage amount of change ΔTDv1 measured from over the first overall amount of change reading sampling time (t1) established as running from said 1st sampling time (ts1) to the mth sampling time (tsM) for the predetermined M-th sampling, and the voltage amount of change ΔTDv2 measured from over the second overall amount of change reading sampling time established as running from said 2nd sampling time (ts2) to the (m+1)th sampling time (tsM+1) for the predetermined M+1-th sampling, said calculated difference ΔHv (where ΔHv=ΔTDv2−ΔTDv1) being stored in a 5th memory means;

a step 9 which repeats said step 8 while calculating the difference value ΔHvn (where ΔHvn=ΔTDv(n+1)−ΔTDvn) between the amount of voltage changes ΔTDvn and ΔTDv(n+1) at each pair of adjacent overall amount of change sampling times tn and tn+1, and stores the calculated results in 5th memory means;

a step 10 which judges whether each of the m amounts of differences in amount of voltage changes ΔHv1 to ΔHvm are positive (zero or greater than zero) or negative (less than zero); and a step 11 which judges, in the sequence of occurrence of said differences in amount of voltage changes ΔHv1 to ΔHvm, whether or not said difference in amount of voltage change ΔHv is zero or negative for S times continuously, and if said difference in amount of voltage change ΔHv is zero or negative S times continuously, stops said charging.

2. A method of charging a secondary battery, comprising:

a step 1 which sets the basic data reading time tb required to read data;

a step 2 which sets the charging rate C;

a step 3 which sets the adjusted data reading time tc, according to the set charging rate C and said basic data reading time tb, said adjusted data reading time tc being unique to said charging rate C;

a step 4 which, during the charging operation, uses an appropriate sampling means to measure the temperature of said secondary battery at least one time during each said adjusted data reading time tc, and which stores the measured temperature data at that time in an appropriate 1st memory means;

a step 5 which repeats the operation of said step 4 a predetermined number of times L, takes the summation of the plurality of data obtained in each adjusted data reading time tc, and stores the resulting amount of adjusted temperature value Dtn over the amount of temperature data change reading sampling time ts (where ts=L×tc) into an appropriate 2nd memory means;

a step 6 which calculates the difference between the amount of adjusted temperature value Dt1 for the 1st sampling time (ts1) and the amount of adjusted temperature value Dt2 for the next, 2nd, sampling time (ts2) obtained in step 5, and which stores the resulting difference in amount of change ΔDt in a 3rd memory means;

a step 7 which continuously repeats said step 6 a predetermined number of times M, and which takes the summation of each of the difference values of ΔDt1 to ΔDtM (M values) obtained at each amount of change reading sampling time (ts), and determines the amount of temperature data change ΔTDt for the overall said amount of temperature change reading sampling time t (where t=ts×M), the results being stored in a 4th memory means;

a step 8 which performs a calculation, based on the values of amount of temperature data change ΔTDt stores in said 4th memory means, to determine the ratio between the temperature amount of change ΔTDt1 measured from over a first overall amount of change reading sampling time t1 established as running from said 1st sampling time (ts1) to the sampling time (tsM) for the predetermined M-th sampling, and the temperature amount of change ΔTDt2 measured from over a second overall amount of change reading sampling time t2 established as running from said 2nd sampling time (ts2) to the sampling time (tsM+1) for the predetermined M+1-th sampling, said calculated ratio ΔHt (where ΔHt=ΔTDt2/ΔTDt1) being stored in a 5th memory means;

a step 9 which repeats the operations of said step 8 while calculating the ratio value ΔHtn (where ΔHtn=ΔTDt(n+1)/ΔTDtn) between the amount of temperature changes ΔTDtn and ΔTDt(n+1) at each paid of adjacent overall amount of change sampling times tn and tn+1, and stores the calculated results in 5th memory means;

a step 10 which judges from the information stored in said 5th memory means whether the ratio ΔHm between two adjacent said temperature amounts of change is equal to or greater than or is less than a given value K; and a step 11 which, if the temperature amount of change ratio ΔHm value is equal to or greater than the given value K, stops said charging.

3. A method of charging a secondary battery, comprising:

a step 1 which sets the basic data reading time tb required to read data;

a step 2 which sets the charging rate C;

a step 3 which sets the adjusted data reading time tc, according to the set charging rate C and said basic data reading time tb, said adjusted data reading time tc being unique to said charging rate C;

a step 4 which, during the charging operation, uses an appropriate sampling means to measure the temperature and the terminal voltage of said secondary battery, respectively, at least one time during each said adjusted data reading time tc, and which stores the temperature data and the terminal voltage data at that time into an appropriate 1st memory means, respectively;

a step 5 which repeats the operation of said step 4 a predetermined number of times L, takes the individual summation of the plurality of battery temperature data and voltage data obtained at each adjusted data reading time tc, and stores the resulting respective amounts of adjusted temperature value Dtn and adjusted voltage value Dvn over the temperature data and terminal voltage data reading sampling time ts (where ts=L×tc) into an appropriate 2nd memory means;

a step 6 which calculates the difference between the amounts of adjusted voltage value Dv1 and adjusted temperature value Dt1 for the 1st sampling time (ts1) and the respective amounts of adjusted voltage value Dv2 and adjusted temperature value Dt2 for the next, 2nd, sampling time (ts2) obtained in step 5, and which stores the resulting difference amounts ΔD for temperature data and terminal voltage data (ΔDv and ΔDt) in a 3rd memory means;

a step 7 which continuously repeats step 6 a predetermined number of times M, and which takes the summation of each of the values of ΔDv1 to ΔDvM (M values) and ΔDt1 to ΔDtM (M values) obtained at each amount of change reading sampling time (ts), and determines the amount of temperature data change and the amount of terminal voltage data change, ΔTDt and ΔTDv, for the overall said amount of change reading sampling time t (where t=ts×M), the results being stored in a 4th memory means;

a step 8 which performs a calculation, based on the values of amount of voltage data change ΔTDv stored in said 4th memory means, to determine the difference between the amount of voltage change ΔTDt1 measured from over a first overall amount of voltage change reading sampling time t1 established as running from said 1st sampling time (ts1) to the sampling time (tsM) for the predetermined M-th sampling, and the amount of voltage change ΔTDt2 measured from over a second overall amount of voltage change reading sampling time t2 established as running from said 2nd sampling time (ts2) to the sampling time (tsM+1) for the predetermined M+1-th sampling, said calculated difference ΔHv (where ΔHv=ΔTDv2–ΔTDv1) being stored in a 6th memory means;

a step 9 which repeats step 8 while calculating the difference value ΔHvn (where ΔHvn=ΔTDv(n+1)–ΔTDvn) between the amount of voltage changes ΔTDvn and ΔTDv(n+1) at each pair of adjacent overall amount of change sampling times tn and tn+1, and stores the calculated results in 6th memory means;

a step 10 which judges whether the m amounts of voltage changes ΔHv1 to ΔHvm are positive (zero or greater than zero) or negative (less than zero);

a step 11 which performs a calculation, based on the values of amount of temperature data change ΔTDt stored in said 4th memory means, to determine the ratio ΔHt between the amount of temperature change ΔTDt1 measured from over a first overall amount of temperature change reading sampling time t1 established as running from said 1st sampling time (ts1) to the sampling time (tsM) for the predetermined M-th sampling, and the amount of temperature change ΔTDt2 measured from over a second overall amount of temperature change reading sampling time t2 established as running from said 2nd sampling time (ts2) to the sampling time (tsM+1) for the predetermined M+1-th sampling, said calculated difference ΔHt (where ΔHt=ΔTDt2/ΔTDt1) being stored in a 5th memory means;

a step 12 which repeats the operations of step 11 while calculating the change ratio value ΔHtn (where ΔHtn=ΔTDt(n+1)/ΔTDtn) between the amount of temperature changes ΔTDtn and ΔTDt(n+1) at each pair of adjacent overall amount of temperature change sampling times tn and tn+1 respectively, and stores the calculated results in 5th memory means;

a step 13 which judges from the information stored in said 5th memory means whether the ratio ΔHtm between two adjacent said amounts of temperature change is equal to or greater than or is less than a given value K; and a step 14 which judges, for said temperature change ratios ΔHtm equal to or greater than the predetermined value of K and in the sequence of occurrence of said differences in amount of voltage changes ΔHv1 to ΔHvm, whether or not said difference in amount of voltage change ΔHv is zero or negative for S times continuously, and if said difference in amount of voltage change is zero or negative S times continuously, stops said charging.

4. A method of charging a secondary battery according to claim 1, 2, or 3, wherein when said sampling means is used during charging to measure the terminal voltage or to measure the temperature of said secondary battery at each corrected data reading time tc, the supply of charging current to said secondary battery is cutoff when making the measurement.

5. A method of charging a secondary battery according to claim 1, 2, or 3, wherein when said sampling means is used during charging to measure the terminal voltage or to measure the temperature of said secondary battery at each corrected data reading time tc, if measurement of even one of these values indicates a level exceeding a predetermined abnormal value level, said charging operation is interrupted.

6. A method of charging a secondary battery according to claim 1, 2, or 3, wherein said corrected data reading time tc is calculated from said charging rate C and said basic data reading time tb by the expression tc=tb×A/C, in which A is a constant.

7. A method of charging a secondary battery according to claim 1, 2, or 3, wherein in a step which repeats measurement of voltage data M times continuously each said data change reading sampling time ts, at each time said voltage data is measured each said data change reading sampling time ts, the amount of change $\Delta TDv$ in voltage data is calculated, a judgment is made as to whether said amount of voltage data change $\Delta TDv$ is positive, negative, or zero, and if it is positive, an appropriate counter value $\Delta S$ which judges a condition of a change in amount of the voltage data change $\Delta TDv$, is reset to zero, but if said amount of voltage data change $\Delta TDv$ is negative or zero, said counter value $\Delta S$ has added to it said $\Delta TDv$ value, said counter value $\Delta S$ being updated to the added value, after which said counter value $\Delta S$ is compared with a preestablished reference value W, and if said counter value $\Delta S$ is smaller than said reference value W, said charging operation is stopped.

8. A method for charging a secondary battery according to claim 7, wherein when the value of said voltage data amount of change $\Delta TDv$ is zero, a preestablished value Z is subtracted from said counter value $\Delta S$.

9. An apparatus for charging a secondary battery comprising:

a current-supplying means for supplying electrical current to the cells of a secondary battery requiring charging;

a switch means provided between said current-supplying means and said secondary battery being charged;

a temperature measurement means for measuring the temperature of said cells;

a sampling means for operating said temperature-measurement means to measure the temperature of said cells with the desired sampling interval;

a charging-control means which is connected to said sampling means and controls said switch means;

a charging rate setting means which sets the charging rate C;

a corrected data reading time setting means which, based on the charging rate C set at said charging rate setting means, calculates from a preestablished basic data reading time tb the corrected data reading time tc, the value of which is characteristic to said charging rate C;

an amount of data change reading sampling time setting means which multiplies the corrected data reading time tc by a preestablished value L to set the temperature data amount of change reading sampling time ts;

an overall sampling time setting means which multiplies said data amount of change reading sampling time ts by a preestablished value M to set the overall sampling time t;

a 1st memory means which stores the values of temperature data dtn measured at each said corrected data reading time tc;

a 2nd memory means which stores the data Dtn which is the summation of a predetermined member L values of temperature data dtn stored in said 1st memory means;

a 3rd memory means which, from the data Dtn stored in said 2nd memory means, stores the difference between data Dt(n−1) measured at the previous amount of change reading sampling time ts and data Dtn measured at the current amount of change reading sampling time ts+1, this difference value being $\Delta Dt$ (where $\Delta Dt=Dtn-Dt(n-1)$);

a 4th memory means which stores the amount of temperature data change $\Delta TDt$ obtained by taking the summation of each of the M amounts of temperature data obtained at each amount of change reading sampling time (ts) in the overall amount of change reading sampling time t (where t=ts×M) obtained by repeating said amount of change reading sampling time (ts) M the required number of M times;

a 5th memory means which, with regard to the temperature data amount of change $\Delta TDt$ stored in said 4th memory means, stores the change ratio $\Delta Ht$ calculated between the amount of temperature data change $\Delta TDtn$ at the 1st overall amount of change reading sampling time tn and the amount of temperature data change $\Delta TDt(n+1)$ at the 2nd overall amount of change reading sampling time tn+1, which is formed by shifting the time by one amount of change reading sampling time (ts), said change ratio being $\Delta Ht$ (where $\Delta Ht=\Delta TDt(n+1)/\Delta TDtn$);

a 1st judgment means which compares said temperature change ratio $\Delta Htm$ between said amounts of temperature change with a preestablished reference value K, and if said change ratio $\Delta Htm$ between said amounts of temperature change exceeds said reference value K, outputs a signal which stops said charging;

a processing means which processes each of the individual data stored by each of said means; and a central processing means which controls the operation of each said means.

10. An apparatus for charging a secondary battery comprising:

a current-supplying means for supplying electrical current to the cells of a secondary battery requiring charging;

a switch means provided between said current-supplying means and said secondary battery being charged;

a terminal voltage measurement means for measuring the terminal voltage of said cells;

a sampling means for operating said terminal voltage measurement means to measure the terminal voltage of said cells with the desired sampling interval;

a charging-control means which is connected to said sampling means and controls said switch means;

a charging rate setting means which sets the charging rate C;

a corrected data reading time setting means which, based on the charging rate C set at said charging rate setting means, calculates from a preestablished basic data reading time tb the corrected data reading time tc, the value of which is characteristic to said charging rate C;

an amount of data change reading sampling time setting means which multiplies the corrected data reading time tc by a preestablished value L to set the temperature data amount of change reading sampling time ts;

a overall sampling time setting means which multiplies said data amount of change reading sampling time ts by a preestablished value M to set the overall sampling time t;

a 1st memory means which stores the values of terminal voltage data dvn measured each said corrected data reading time tc;

a 2nd memory means which stores the data Dvn which is the summation of the L values of temperature data dvn stored in said 1st memory means;

a 3rd memory means which, from the data Dvn stored in said 2nd memory means, stores the difference between data Dv(n−1) measured at the previous amount of change reading sampling time ts and data Dvn measured at the current amount of change reading sampling time ts+1, this difference value being ΔDv (where ΔDv=Dvn−Dv(n−1));

a 4th memory means which stores the amount of terminal voltage data change ΔTDv obtained by taking the summation each of the M amounts of voltage change data obtained at each amount of change reading sampling time in the overall amount of change reading sampling time t (where t=ts×M) obtained by repeating said amount of change reading sampling time (ts) M the required number of M times;

a 6th memory means which, with regard to the terminal voltage data amount of change ΔTDv stored in said 4th memory means, stores the difference ΔHvm calculated between the amount of voltage data change ΔTDvn measured in the 1st overall amount of data change reading sampling time tn and the amount of voltage data change ΔTDv(n+1) measured in the 2nd overall amount of data change reading sampling time tn+1, which is formed by shifting the time by one amount of change reading sampling time (ts), said difference being ΔHvm (where ΔHvm=ΔHvm=Hv(m+1)−Hvm);

a judgment means which, with regard to each the m values of voltage data amounts of change differences ΔHv1 to ΔHvm serially stored in said 6th memory means, makes a judgment as to whether each one of said differences ΔHv1 to ΔHvm is positive (zero or larger) or negative (less than zero), and which performs said judgment processing in the sequence of occurrence of said voltage data amount of change differences ΔHv1 to ΔHvm, and if each one of the successively measured voltage data amount of change difference ΔHv show a negative value, at least a preestablished number of times S, continuously, stops said charging operation;

a processing means which processes each of the individual data stored by each of said means; and a central processing means which controls the operation of each said means.

11. A method of charging a secondary battery according to claim 4, wherein when said sampling means is used during charging to measure the terminal voltage or to measure the temperature of said secondary battery at each corrected data reading time tc, if measurement of even one of these values indicates a level exceeding a predetermined abnormal value level, said charging operation is interrupted.

12. A method of charging a secondary battery according to claim 4, wherein said corrected data reading time tc is calculated from said charging rate C and said basic data reading time tb by the expression tc=tb×A/C, in which A is a constant.

13. A method of charging a secondary battery according to claim 5, wherein said corrected data reading time tc is calculated from said charging rate C and said basic data reading time tb by the expression tc=tb×A/C, in which A is a constant.

14. A method of charging a secondary battery according to claim 4, wherein in a step which repeats measurement of voltage data M times continuously each said data change reading sampling time ts, at each time said voltage data is measured each said data change reading sampling time ts, the amount of change ΔTDv in voltage data is calculated, a judgment is made as to whether said amount of voltage data change ΔTDv is positive, negative, or zero, and if it is positive, an appropriate counter value ΔS which judges a condition of a change in amount of the voltage data change ΔTDv, is reset to zero, but if said amount of voltage data change ΔTDv is negative or zero, said counter value ΔS has added to it said ΔTDv value, said counter value ΔS being updated to the added value, after which said counter value ΔS is compared with a preestablished reference value W, and if said counter value ΔS is smaller than said reference value W, said charging operation is stopped.

15. A method of charging a secondary battery according to claim 5, wherein in a step which repeats measurement of voltage data M times continuously each said data change reading sampling time ts, at each time said voltage data is measured each said data change reading sampling time ts, the amount of change ΔTDv in voltage data is calculated, a judgment is made as to whether said amount of voltage data change ΔTDv is positive, negative, or zero, and if it is positive, an appropriate counter value ΔS which judges a condition of a change in amount of the voltage data change ΔTDv, is reset to zero, but if said amount of voltage data change ΔTDv is negative or zero, said counter value ΔS has added to it said ΔTDv value, said counter value ΔS being updated to the added value, after which said counter value ΔS is compared with a preestablished reference value W, and if said counter value ΔS is smaller than said reference value W, said charging operation is stopped.

16. A method of charging a secondary battery according to claim 6, wherein in a step which repeats measurement of voltage data M times continuously each said data change reading sampling time ts, at each time said voltage data is measured each said data change reading sampling time ts, the amount of change ΔTDv in voltage data is calculated, a judgment is made as to whether said amount of voltage data change ΔTDv is positive, negative, or zero, and if it is positive, an appropriate counter value ΔS which judges a condition of a change in amount of the voltage data change ΔTDv, is reset to zero, but if said amount of voltage data change ΔTDv is negative or zero, said counter value ΔS has added to it said ΔTDv value, said counter value ΔS being updated to the added value, after which said counter value ΔS is compared with a preestablished reference value W, and if said counter value ΔS is smaller than said reference value W, said charging operation is stopped.

17. A method for charging a secondary battery according to claim 14, wherein when the value of said voltage data amount of change ΔTDv is zero, a preestablished value Z is subtracted from said counter value ΔS.

18. A method for charging a secondary battery according to claim 15, wherein when the value of said voltage data amount of change ΔTDv is zero, a preestablished value Z is subtracted from said counter value ΔS.

19. A method for charging a secondary battery according to claim 16, wherein when the value of said voltage data amount of change ΔTDv is zero, a preestablished value Z is subtracted from said counter value ΔS.

* * * * *

UNITED STATES PATENT AND TRADEMARK OFFICE
CERTIFICATE OF CORRECTION

PATENT NO. : 5,583,871

DATED : December 10, 1996

INVENTOR(S) : Stewart N. Simmonds and Isamu Miyamoto

It is certified that error appears in the above-identified patent and that said Letters Patent is hereby corrected as shown below:

Column 3, line 15, delete the word "heed" and insert the word --need--.

Column 3, line 27, delete the word "the" and insert the word --there--.

Column 14, line 21, beginning with the phrase "which is set" through to line 55, ending with the word "voltage," delete this text from Column 14 and insert all thirty-five (35) lines of text at Column 13, line 18 after the word "tc,".

Column 16, line 45, delete "III" and insert --II--.

Column 17, line 16, delete "mad" and insert --made--.

Column 29, line 18, Table II, table column entitled "Battery Temperature (°C.)," all temperatures listed beginning with the numerical temperature of "9.54" through to line 58 ending with the numerical temperature of "7.76", insert the number --2-- as the first digit of the Battery Temperature (°C.). These number should have been 29.54, 29.32, 28.65, etc.

Column 30, line 6, Table II, table column entitled "Battery Temperature (°C.)," all temperatures listed beginning with the numerical temperature of "7.99" through to line 8 ending with the numerical temperature of "8.87", insert the number --2-- as the first digit of the Battery Temperature (°C.). These numbers should have been 27.99, 28.21, 28.43, etc.

Column 30, line 7, Table II, table column entitled "Battery Temperature (°C.)," delete the temperature "1.09" and insert the temperature --31.09--.

UNITED STATES PATENT AND TRADEMARK OFFICE
CERTIFICATE OF CORRECTION

PATENT NO. : 5,583,871
DATED : December 10, 1996
INVENTOR(S) : Stewart N. Simmonds and Isamu Miyamoto It is certified that error appears in the above-indentified patent and that said Letters Patent is hereby corrected as shown below:

Column 35, line 11, delete the word "paid" and insert the word --pair--.

Signed and Sealed this

Eleventh Day of August 1998

Attest:

BRUCE LEHMAN

Attesting Officer        Commissioner of Patents and Trademarks